United States Patent
Ratering

(10) Patent No.: US 10,838,573 B2
(45) Date of Patent: Nov. 17, 2020

(54) PRECISE VALUE SELECTION WITHIN LARGE VALUE RANGES

(71) Applicant: GE Inspection Technologies, LP, Lewistown, PA (US)

(72) Inventor: Ralf Ratering, Bruehl (DE)

(73) Assignee: GE SENSING & INSPECTION TECHNOLOGIES, GMBH, Hürth (DE)

( * ) Notice: Subject to any disclaimer, the term of this patent is extended or adjusted under 35 U.S.C. 154(b) by 1 day.

(21) Appl. No.: 16/209,712

(22) Filed: Dec. 4, 2018

(65) Prior Publication Data

US 2020/0174643 A1 Jun. 4, 2020

(51) Int. Cl.

| | |
|---|---|
| *G06F 3/048* | (2013.01) |
| *G06F 3/0481* | (2013.01) |
| *G06F 3/01* | (2006.01) |
| *G06F 3/0486* | (2013.01) |
| *G01N 29/06* | (2006.01) |
| *G06F 3/0488* | (2013.01) |
| *G01N 29/24* | (2006.01) |
| *G06F 3/0484* | (2013.01) |

(52) U.S. Cl.
CPC ..... *G06F 3/04812* (2013.01); *G01N 29/0609* (2013.01); *G01N 29/24* (2013.01); *G06F 3/017* (2013.01); *G06F 3/0486* (2013.01); *G06F 3/04847* (2013.01); *G06F 3/04886* (2013.01)

(58) Field of Classification Search
CPC .. G06F 3/04812; G06F 3/017; G06F 3/04847; G06F 3/0486; G06F 3/04886; G01N 29/0609; G01N 29/24
See application file for complete search history.

(56) References Cited

U.S. PATENT DOCUMENTS

| | | |
|---|---|---|
| 7,080,324 B1 | 7/2006 | Nelson et al. |
| 2014/0330121 A1* | 11/2014 | Kim ............. A61B 8/485 600/438 |
| 2016/0110243 A1 | 4/2016 | Domke et al. |

(Continued)

OTHER PUBLICATIONS

Pierre Chatelain et al., Confidence-Driven Control of an Ultrasound Probe, Dec. 1, 2017, IEEE Transactions on Robotics, vol. 33 No. 6, pp. 1410-1424 (Year: 2017).*

(Continued)

*Primary Examiner* — Tam T Tran
(74) *Attorney, Agent, or Firm* — Mintz Levin Cohn Ferris Glovsky and Popeo, P.C.

(57) ABSTRACT

Systems, methods, and computer readable mediums are provided for selecting a precise value within a large value range. Data received from an ultrasonic testing environment can include a range of values associated with one or more parameters to be configured for performing ultrasonic inspection of a test object. A control in a user interface of the ultrasonic testing environment can be provided and include a display portion displaying one or more parameters and one or more values within the range of values associated with the one or more parameters. The control also includes an interactive portion configured to receive a plurality of inputs. Based on the inputs a selected value associated with a first parameter can be determined. The selected value associated with the first parameter can be output as a static display within the display portion of the control.

29 Claims, 9 Drawing Sheets

(56) References Cited

U.S. PATENT DOCUMENTS

2017/0269696 A1* 9/2017 Naidoo .................. G06F 3/042
2017/0290974 A1* 10/2017 Tsoukalis ............ A61M 5/1407

OTHER PUBLICATIONS

Ryu Nakadate et al., Development of Assisted-Robotic System Designed to Measure the Wave Intensity with an Ultrasonic Diagnostic Device, Oct. 1, 2009, IEEE/RSJ International Conference, pp. 510-515 (Year: 2009).*

* cited by examiner

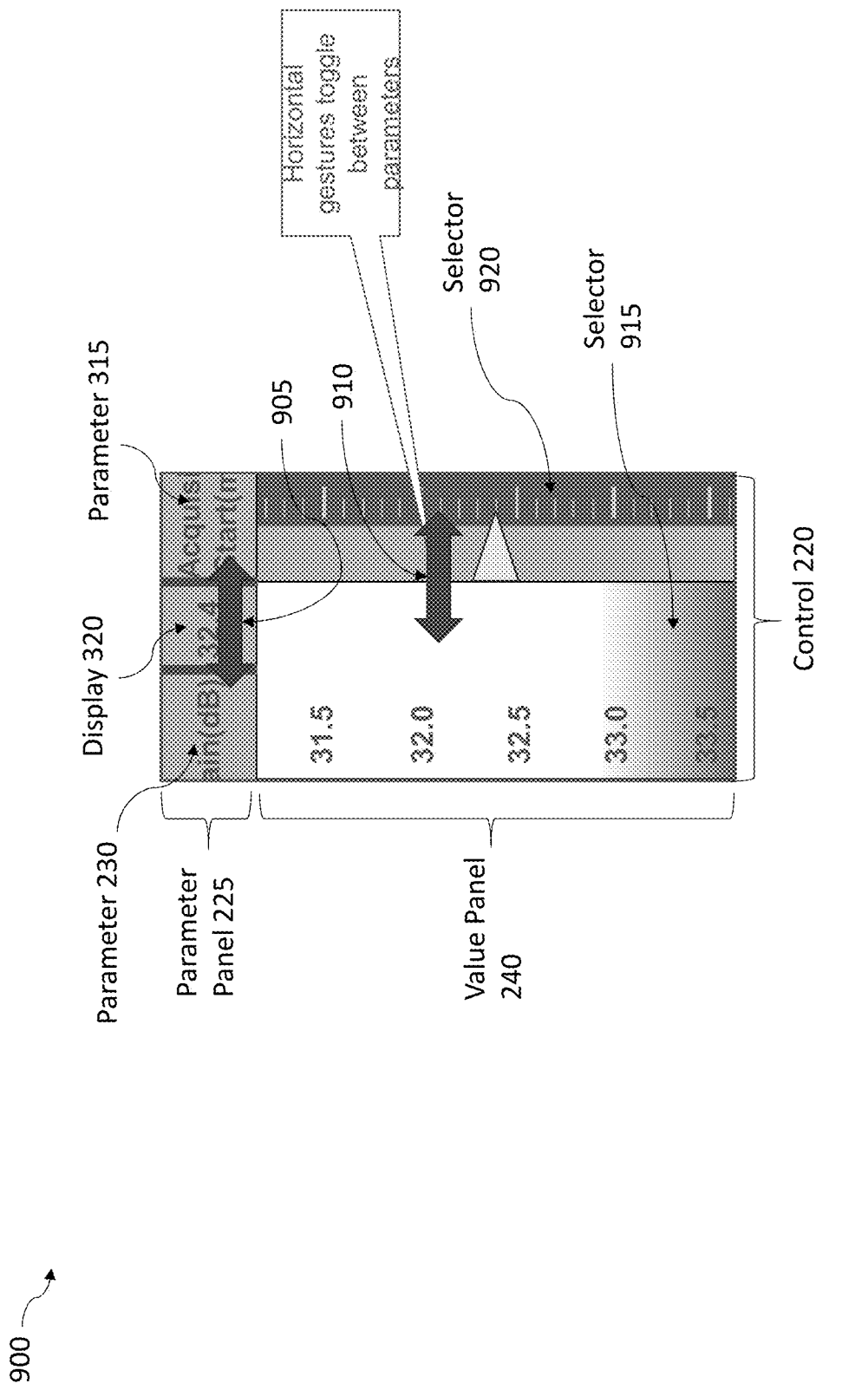

PRECISE VALUE SELECTION WITHIN LARGE VALUE RANGES

BACKGROUND

Ultrasonic testing is one type of non-destructive testing (NDT) that can be used to inspect characteristics of a component or a test object, without causing damage, to ensure that the inspected characteristics satisfy required specifications. Ultrasonic testing can be used in a number of industries such as aerospace, automotive, power generation, oil and gas transport or refining where component failures would be catastrophic.

In an ultrasonic testing environment, an ultrasonic probe can generate one or more ultrasonic waves and these waves can be directed towards a test object. As the ultrasonic waves contact and penetrate the target, they can reflect from features such as outer surfaces and interior defects (e.g., cracks, porosity, etc.). Typically, ultrasonic testing environments include a variety of user interfaces to control the ultrasonic probe and display ultrasonic testing data. Additionally, user interlaces can also include a variety of input mechanisms to configure one or more parameters associated with the operation of the ultrasonic testing environment. Typically, the input mechanisms include mechanical input mechanisms, for example, rotating hardware knobs that allow for precise selection of specific values of various parameters, such as gain, acquisition range, or gate positions, which are necessary to be configured in order to operate the ultrasonic testing environment.

Touchscreen interfaces are input devices that are coupled to an electronic visual display of an information processing system. A user can provide input to or control the underlying information processing system through simple or multi-touch gestures by touching the screen with one or more fingers or a stylus-like input device. Additionally, a user can interact with a touchscreen to respond to data being displayed and to control one or more aspects of the information processing system. In this way, the user interacts directly with the touchscreen, instead of using a mouse or keyboard to provide inputs to control the information processing system.

SUMMARY

Improved ultrasonic testing environments can be configured with touchscreen interfaces that enable more precise selection of parameter values. Ultrasonic testing environments configured with touchscreen interfaces provide a more robust user experience when selecting parameter values compared to traditional systems which include mechanical input components as described above.

In one aspect, a system for selecting a precise value within a large value range is provided. The system can include an ultrasonic testing environment including a memory storing non-transitory computer-readable instructions. The system can also include a data processor, the data processor configured to execute the non-transitory computer-readable instructions. The instructions, which when executed, can cause the processor to perform operations including receiving data from the ultrasonic testing environment. The data including a range of values associated with one or more parameters to be configured for performing ultrasonic inspection of a test object. The instructions, which when executed, can further cause (lie processor to perform operations including displaying a control in a user interlace of the ultrasonic testing environment. The control including a display portion configured to display one or more parameters and one or more values within the range of values associated with the one or more parameters. The control also includes an interactive portion configured to receive a plurality of inputs. The instructions, which when executed, can further cause the processor to perform operations including determining a selected value associated with a first parameter. The instructions, which when executed, can further cause the processor to perform operations including displaying the selected value associated with the first parameter as a static display within the display portion of the control.

In another embodiment, the ultrasonic testing environment includes a three-dimensional space enclosing the test object, an ultrasonic probe assembly including an ultrasonic probe, a controller coupled to the ultrasonic probe assembly and a processor coupled to the controller, the processor configured to receive user input for performing ultrasonic testing on the test object and in response to the user input, execute instructions causing the ultrasonic probe to transmit ultrasonic signals into the test piece and to receive reflected ultrasonic signals from the test piece.

In another embodiment, the system can include instructions, which when executed, can further cause the processor to determine the selected value associated with the first parameter by receiving a first value selection input applied to the interactive portion. The instructions, which when executed, can further cause the processor to determine the selected value associated with the first parameter by determining an input direction and an input speed associated with the first value selection input. The instructions, which when executed, can further cause the processor to determine the selected value associated with the first parameter by determining a first subset of values, included in the range of values, based on the input speed and the input direction associated with the first value selection input. The instructions, which when executed, can further cause the processor to determine the selected value associated with the first parameter by providing the first subset of values as a first dynamic display within the display portion of the control. The instructions, which when executed, can further cause the processor to determine the selected value associated with the first parameter by receiving a second value selection input applied to the interactive portion. The instructions, which when executed, can further cause the processor to determine the selected value associated with the first parameter by determining an input direction and an input speed associated with the second value selection input. The instructions, which when executed, can further cause the processor to determine the selected value associated with the first parameter by determining a second subset of values, included in the range of values, based on the input speed and the input direction associated with the second value selection input. The instructions, which when executed, can further cause the processor to determine the selected value associated with the first parameter by providing the second subset of values as a second dynamic display within the display portion of the control. The instructions, which when executed, can further cause the processor to determine the selected value associated with the first parameter by determining the selected value from the second subset of values based on removal of the second value selection input.

In another embodiment, the input direction associated with the first and second value selection inputs includes a vertical input direction and, the input speed associated with the first and second value selection inputs includes a swipe-gesture input speed or a drag gesture input speed. In another embodiment, the first and second subsets of values are provided in the dynamic display at a display rate determined based on the input speed and a configurable friction parameter configured to display successive values within the first and second subset of values at a predetermined rate.

In another embodiment, the instructions, which when executed, can further cause the processor to receive a tap-gesture input upon provision of the first dynamic display. The instructions, which when executed, can further cause the processor to provide the selected value in a static display responsive to the received tap-gesture input. The selected value provided as the value displayed in the first dynamic display at a time the tap-gesture input was received.

In another embodiment, the instructions which when executed, can further cause the processor to determine a selected parameter by receiving a first parameter selection input applied to the interactive portion. The instructions which when executed, can further cause the processor to determine tile selected parameter by determining an input direction and an input speed associated with the first parameter selection input. The instructions which when executed, can further cause the processor to determine the selected parameter by determining a first subset of parameters, included in the one or more parameters, based on the input speed and the input direction associated with the first parameter selection input. The instructions which when executed, can further cause the processor to determine the selected parameter by providing the first subset of parameters as a first dynamic display within the display portion of the control. The instructions which when executed, can further cause the processor to determine the selected parameter by receiving a second parameter selection input applied to the interactive portion. The instructions which when executed, can further cause the processor to determine the selected parameter by determining an input direction and an input speed associated with the first parameter selection input. The instructions which when executed, can further cause the processor to determine the selected parameter by determining a first subset of parameters, included in the one or more parameters, based on the input speed and the input direction associated with the first parameter selection input. The instructions which when executed, can further cause the processor to determine the selected parameter by providing the first subset of parameters as a first dynamic display within the display portion of the control. The instructions which when executed, can further cause the processor to determine the selected parameter by receiving a second parameter selection input applied to the interactive portion. The instructions which when executed, can further cause the processor to determine the selected, parameter by determining an input direction and an input speed associated with the second parameter selection input. The instructions which when executed, can further cause the processor to determine the selected parameter by determining a second subset of parameters, included in the one or more parameters, based on the input speed and the input direction associated with the second parameter selection input. The instructions which when executed, can further cause the processor to determine the selected parameter by providing the second subset of parameters as a second dynamic display within the display portion of the control. The instructions which when executed, can further cause the processor to determine the selected parameter by determining the selected parameter from the second subset of parameters based on removal of the second parameter selection input. The instructions which when executed, can further cause the processor to output the selected parameter as a static display within the display portion of the control.

In another embodiment, the input direction includes a horizontal input direction and the input speed is associated with an input speed corresponding to a swipe-gesture input or an input speed corresponding to a drag-gesture input. In another embodiment, the subset of parameters is provided in the dynamic display at a display rate determined based on the input speed and a configurable friction parameter configured to display successive parameters within the subset of parameters at a predetermined rate.

In another embodiment, the instructions, which when executed, can further cause the processor to receive a tap-gesture input upon provision of the first dynamic display. In another embodiment, the instructions, which when executed, can further cause the processor to provide the selected parameter in a static display responsive to the received tap-gesture input. The selected parameter provided as the parameter displayed in the first dynamic display at a time the tap gesture input was received.

In another aspect, methods for selecting a precise value within a large value range are also provided. In one embodiment, the method can include receiving data from an ultrasonic testing environment. The data including a range of values associated with one or more parameters to be configured for performing ultrasonic inspection of a test object. The method can also include displaying a control in a user interface of the ultrasonic testing environment. The control including a display portion configured to display one or more parameters and one or more values within the range of values associated with the one or more parameters. The control also includes an interactive portion configured to receive a plurality of inputs. The method can also include determining a selected value associated with a first parameter. The method can also include displaying the selected value associated with the first parameter as a static display within the display portion of the control.

In another embodiment, the ultrasonic testing environment includes an three-dimensional space enclosing the test object, an ultrasonic probe assembly including an ultrasonic probe, a controller coupled to the ultrasonic probe assembly and a processor coupled to the controller, the processor configured to receive user input for performing ultrasonic testing on the test object and in response to the user input, execute instructions causing the ultrasonic probe to transmit ultrasonic signals into the test piece and to receive reflected ultrasonic signals from the test piece.

In another embodiment, the method can include determining the selected value associated with the first parameter. The method to determine the selected value associated with the first parameter can include receiving a first value selection input applied to the interactive portion. The method to determine the selected value associated with the first parameter can further include determining the selected value associated with the first parameter by determining an input direction and an input speed associated with the first value selection input. The method to determine the selected value associated with the first parameter can also include determining the selected value associated with the first parameter by determining a first subset of values, included in the range of values, based on the input speed and the input direction associated with the first value selection input. The method to determine the selected value associated with the first parameter can also include determining the selected value associated with the first parameter by providing the first subset of values as a first dynamic display within the display portion of the control. The method to determine the selected value associated with the first parameter can also include determining the selected value associated with the first parameter by receiving a second value selection input applied to the interactive portion. The method to determine the selected value associated with the first parameter can also include determining the selected value associated with the first parameter by determining an input direction and an input speed associated with the second value selection input. The method to determine the selected value associated with the first parameter can also include determining the selected value associated with the first parameter by determining a second subset of values, included in the range of values, based on the input speed and the input direction associated with the second value selection input. The method to determine the selected value associated with the first parameter can also include determining the selected value associated with the first parameter by providing the second subset of values as a second dynamic display within the display portion of the control. The method to determine the selected value associated with the first parameter can also include determining the selected value associated with the first parameter by determining the selected value from the second subset of values based on removal of the second value selection input.

In another embodiment, the input direction associated with the first and second value selection inputs includes a vertical input direction and the input speed associated with the first and second value selection inputs includes a swipe-gesture input speed or a drag-gesture input speed. In another embodiment, the first and second subsets of values are provided in the dynamic display at a display rate determined based on the input speed and a configurable friction parameter configured to display successive values within the first and second subset of values at a predetermined rate.

In another embodiment, the method can include receiving a tap-gesture input upon provision of the first dynamic display. The file method can further can include providing the selected value in a static display responsive to the received tap-gesture input. The selected value provided as the value displayed in the first dynamic display at a time the tap-gesture input was received.

In another embodiment, the method can include determining a selected parameter. The method to determine a selected parameter can include receiving a first parameter selection input applied to the interactive portion. The method to determine the selected parameter can further include determining an input direction and an input speed associated with the first parameter selection input. The method to determine the selected parameter can also include determining a first subset of parameters, included in the one or more parameters, leased on the input speed and the input direction associated with the first parameter selection input. The method to determine the selected parameter can further include providing the first subset of parameters as a first dynamic display within the display portion of the control. The method to determine the selected parameter can further include receiving a second parameter selection input applied to the interactive portion. The method to determine the selected parameter can also include determining an input direction and an input speed associated with the first parameter selection input. The method to determine the selected parameter can also include determining a first subset of parameters, included in the one or inure parameters, based on the input speed and the input direction associated with the first parameter selection input. The method to determine the selected parameter can further include providing the first subset of parameters as a first dynamic display within the display portion of the control. The method to determine the selected parameter can also include receiving a second parameter selection input applied to the Interactive portion. The method to determine the selected parameter can further include determining an input direction and an input speed associated with the second parameter selection input. The method to determine the selected parameter can also include determining a second subset of parameters, included in the one or more parameters, based on the input speed and the input direction associated with the second parameter selection input. The method to determine the selected parameter can further include providing the second subset of parameters as a second dynamic display within the display portion of the control. The method to determine the selected parameter can also include determining the selected parameter from the second subset of parameters based on removal of the second parameter selection input. The method can also include outputting the selected parameter as a static display within the display portion of the control.

In another embodiment, the input direction includes a horizontal input direction and the input speed is associated with an input speed corresponding to a swipe-gesture input or an input speed corresponding to a drag-gesture input. In another embodiment, the subset of parameters is provided in the dynamic display at a display rate determined based on the input speed and a configurable friction parameter configured to display successive parameters within the subset of parameters at a predetermined rate.

In another embodiment, the method can include receiving a tap gesture input upon provision of the first dynamic display. In another embodiment, the method can include providing the selected parameter in a static display responsive to the received lap-gesture input. The selected parameter provided as the parameter displayed in the first dynamic display at a time the lap-gesture input was received.

In another aspect, a computer-readable storage medium containing program instructions for causing a computer to select a precise value within a large value range is also provided. The program instructions contained on the computer-readable storage medium perform the method including receiving data from an ultrasonic testing environment. The data including a range of values associated with one or more parameters to be configured for performing ultrasonic inspection of a test object. The program instructions further perform the method including displaying a control in a user interface of the ultrasonic testing environment. The control including a display portion configured to display one or more parameters and one or more values within the range of values associated with the one or more parameters. The control also includes an interactive portion configured to receive a plurality of inputs. The program instructions further perform the method including determining a selected value associated with a first parameter. The program instructions further perform the method including displaying the selected value associated with the first parameter as a static display within the display portion of the control.

In another aspect, the computer-readable storage medium contains program instructions for causing a computer to determine the selected value associated with the first parameter. The program instructions cause the computer to determine the selected value associated with the first parameter by performing the method including receiving a first value selection input applied to the interactive portion. The program instructions also cause the computer to determine the selected value associated with the first parameter by determining the selected value associated with the first parameter by determining an input direction and an input speed associated with the first value selection input. The program instructions further cause the computer to determine the selected value associated with the first parameter by determining a first subset of values, included in the range of values, based, on the input speed and the input direction associated with the first value selection input. The program instructions also cause the computer to determine the selected value associated with the first parameter by providing the first subset of values as a first dynamic display within the display portion of the control. The program instructions further cause the computer to determine the selected value associated with the first parameter by receiving a second value selection input applied to the interactive portion. The program instructions also cause the computer to determine the selected value associated with the first parameter by determining an input direction and an input speed associated with the second value selection input. The program instructions further cause the computer to determine the selected value associated with the first parameter by determining a second subset of values, included in the range of values, based on the input speed and the input direction associated with the second value selection input. The program instructions also cause the computer to determine the selected value associated with the first parameter by providing the second subset of values as a second dynamic display within the display portion of the control. The program instructions further cause the computer to determine the selected value associated with the first parameter by determining the selected value from the second subset of values based on removal of the second value selection input.

In another embodiment, the ultrasonic testing environment includes an three-dimensional space enclosing the test object, an ultrasonic probe assembly including an ultrasonic probe, a controller coupled to the ultrasonic probe assembly and a processor coupled to the controller, the processor configured to receive user input for performing ultrasonic testing on the test object and in response to the user input, execute instructions causing the ultrasonic probe to transmit ultrasonic signals into the test piece and to receive reflected ultrasonic signals from the test piece.

In another embodiment, the input direction associated with the first and second value selection inputs includes a vertical input direction and the input speed associated with the first and second value selection inputs includes a swipe gesture input speed or a drag-gesture input speed. In another embodiment, the first and second subsets of values are provided in the dynamic display at a display rate determined based on the input speed and a configurable friction parameter configured to display successive values within the first and second subset or values at a predetermined rate.

In another embodiment, the program instructions can cause the computer to determine a selected parameter. The program instructions can cause the computer to determine the selected parameter by receiving a first parameter selection input applied to the interactive portion. The program instructions can also cause the computer to determine the selected parameter by determining an input direction and an input speed associated with the first parameter selection input. The program instructions can further cause the computer to determine the selected parameter by determining a first subset of parameters, included in the one or more parameters, based on the input speed and the input direction associated with the first parameter selection input. The program instructions can further cause the computer to determine the selected parameter by providing the first subset of parameters as a first dynamic display within the display portion of the control. The program instructions can also cause the computer to determine the selected parameter by receiving a second parameter selection input applied to the interactive portion. The program instructions can further cause the computer to determine the selected parameter by determining an input direction and an input speed associated with the first parameter selection input. The program instructions can also cause the computer to determine the selected parameter by determining a first subset of parameters, included in the one or more parameters, bused on the input speed and the input direction associated with the first parameter selection input. The program instructions can further cause the computer to determine the selected parameter by providing the first subset of parameters as a first dynamic display within the display portion of the control. The program instructions can also cause the computer to determine the selected parameter by receiving a second parameter selection input applied to the interactive portion. The program instructions can also cause the computer to determine the selected parameter by determining an input direction and an input speed associated with the second parameter selection input. The program instructions can further cause the computer to determine the selected parameter by determining a second subset of parameters, included in the one or more parameters, based on the input speed and the input direction associated with the second parameter selection input. The program instructions can also cause the computer to determine the selected parameter by providing the second subset of parameters as a second dynamic display within the display portion of the control. The program instructions can further cause the computer to determine the selected parameter by determining the selected parameter from the second subset of parameters based on removal of the second parameter selection input. The program instructions can also cause the computer to output the selected parameter as a static display within the display portion of the control.

In another embodiment, the subset of parameters is provided in the dynamic display at a display rate determined based on the input speed and a configurable friction parameter configured to display successive parameters within the subset of parameters at a predetermined rate.

In another embodiment, the program instructions can also cause the computer to receive a tap-gesture input upon provision of the first dynamic display. In another embodiment, the program instructions can further cause the computer to provide the selected parameter in a static display responsive to the received tap-gesture input. The selected parameter provided as the parameter displayed in the first dynamic display at a time the tap-gesture input was received.

DESCRIPTION OF DRAWINGS

These and other features will be more readily understood from the following detailed description taken in conjunction with the accompanying drawings, in which:

FIG. 9 illustrates an exemplary embodiment of a user interface for determining a selected parameter in operation;

Figure 1:
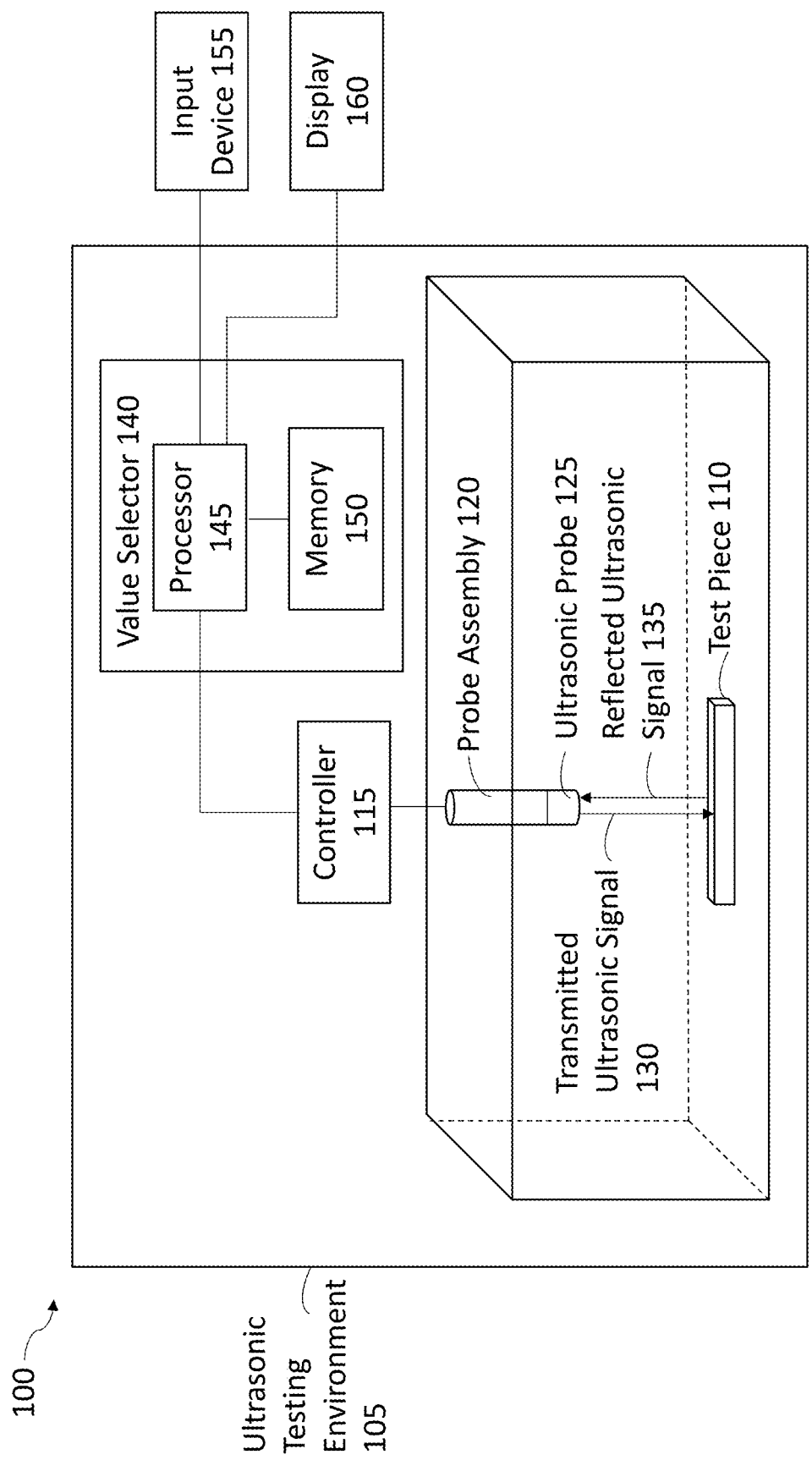
FIG. 1 illustrates an exemplary embodiment of a system configured to select a precise value within a large range of values.

It is noted that the drawings are not necessarily to scale. The drawings are intended to depict only typical aspects of the subject matter disclosed herein, and therefore should not be considered as limiting the scope of the disclosure.

DETAILED DESCRIPTION

Providing inputs to configure one or more parameters of an ultrasonic testing environment can be performed using mechanical input components that are operatively coupled to the ultrasonic testing environment. The mechanical input components can include a mouse, a keyboard, and/or one or more knobs or buttons which can be implemented as physical rotating knobs, mechanical sliders, or hardware buttons that are configured to allow a user to select a specific value for a parameter in order to perform ultrasonic testing. When performing ultrasonic testing, a precise parameter value can be selected to successfully configure the ultrasonic testing environment. Often a user can configure multiple parameters such as the frequency or bandwidth, beam angle, gain, and pulse energy associated with a component of the ultrasonic testing environment, such as a transducer, prior to performing ultrasonic inspection of a test object. To configure each parameter for testing, the user selects a precise value for the parameter from among large ranges of possible values. Rapidly and precisely selecting the exact parameter value from the large range of values can reduce testing time and improve the quality of the test results.

The parameter may be associated with a large range of possible values to be selected and the user can select a precise parameter value from among the large range of parameter values by interacting, for example, with a rotary knob. The user can rotate the rotary knob to select the precise value of the parameter that the user is attempting to configure within the ultrasonic testing environment. User interfaces that include these kinds of mechanical input components can provide limited feedback about progress toward the desired parameter value that has results from the user's input. For example, such mechanical input components can include a visual scale identifying the broad range of values, usually sub-divided into uniform increments, from which the user is attempting to select a precise value. Using these types of user interfaces it can be difficult for a user to ascertain how much additional input (e.g., additional turns of the rotary knob) may be required to precisely achieve a specific parameter value due to the magnitude of the visual scale or scale increments. As a result, a user may be required to persistently and continuously rotate or adjust the rotary knob through the large range of parameter values before reaching the specific parameter value that the user is attempting to select.

Ultrasonic testing environments which include touchscreen interfaces can be configured with a variety or software-based input mechanisms, also known as controls or interactive graphical affordances, which enable a user to manipulate ultrasonic testing data in an interface by touching the input mechanism. Such input mechanisms generally provide a greater degree of visual feedback and can thus provide the user with a greater sense of confidence as they attempt interact with the input mechanism toward their desired objective. However, touchscreen input mechanisms such as drag-able sliders, clickable scroll bars, rotatable dials and gauges, or spin-able controls, can be limited in their ability to dynamically determine and adjust the range of values associated with a particular parameter as the user interacts with the input mechanism to select a precise value from within a large range of values.

In general, systems, methods, and computer readable mediums are provided herein for improved ultrasonic testing environments that include touchscreens with user interface controls or input mechanisms that are configured to select a precise parameter value from within a large range of values and/or to select one or more parameters from among a plurality of parameters. An improved ultrasonic testing environment can include a user interface configured to receive and display a variety of data associated with ultrasonic testing. The data can include a large range of values corresponding to one or more parameters. A user can be required to select a precise value from within the large range of values in order to perform ultrasonic testing of a test object. The user interface can include a control implemented as a touchscreen interface that can be configured with a display portion to display selected values and parameters, as well as an interactive portion that is configured to receive user inputs provided via touch. As the user interacts with the control by touching the interactive portion of the control, selected values associated with a particular parameter can be determined based on the speed, direction, and gesture type of the user's input. Additionally, selected parameters can also be determined based on the speed, direction, and gesture type of the user's input as applied to the interactive portion of the control. Based on the user's input, the display portion of the control can dynamically update and provide an improved user experience as the user determines a precise value or parameter selection. The control can also include configurable settings to determine the rate at which successive values and/or parameters or increments of values and/or parameters are dynamically displayed in the display portion of the control.

In this way, the systems, methods, and computer readable mediums described herein provide an improved user interface and user interface control for selecting a precise parameter value among a large range of potential values in an ultrasonic testing environment. The systems, methods, and computer readable mediums described herein also provide an improved user interface and user interface control for selecting a parameter from among one or more parameters in an ultrasonic testing environment. In some implementations, the improved user interface and interlace controls, implemented as a touchscreen interlace in an ultrasonic testing environment, can improve the presentation of ultrasonic testing and configuration data, can improve the user experience when configuring the ultrasonic testing environment, and can reduce the risk of operator error when inputting parameter values or making parameter selections. Providing the user interface and the interface control in this manner can improve the functionality of a computing device configured within the ultrasonic testing environment with regard to the display, receipt of user input, and the execution of functionality associated with performing operations related to ultrasonic testing or inspection. As a result, some improved computing devices can execute configuration operations, such as parameter setting, more efficiently due to more accurate value and parameter selection than computing devices in ultrasonic testing environments that do not include the features described herein.

Embodiments of systems, methods, and computer readable mediums for precisely selecting a parameter value or a parameter among a large range of values or parameters in an ultrasonic testing environment are discussed herein. However, embodiments of the disclosure can be employed for selecting a parameter value or a parameter among a large range of values or parameters in other data processing environments without limit.

FIG. 1 is a diagram illustrating an example system 100 for selecting a precise value within a large range of values. In some embodiments, the example system 100 can also be configured to determine a selected parameter from one or more parameters. The system 100 includes an ultrasonic testing environment 105, which includes a test piece 110, a controller 115, a probe assembly 120 and an ultrasonic probe 125. The ultrasonic probe 125 emits the transmitted ultrasonic signals 130 toward a test piece 110 and receives the reflected ultrasonic signals 135 back from the test piece 110. The system 100 also includes a value selector 140 including a processor 145 and a memory 150. The processor 145 is communicatively coupled to an input device 155 to receive user inputs associated with performing the ultrasonic testing such as parameter value selection and/or parameter selection and a display 160. The display 160 can be configured to display data associated with performing ultrasonic testing in one or more user interlaces provided via the display 160.

As shown in FIG. 1, the system 100 includes an ultrasonic testing environment 105. The ultrasonic testing environment 105 includes a three-dimensional volume in which ultrasonic testing may be performed. For example, as shown in FIG. 1, a rectangular tank is configured and a test piece 110 is positioned for ultrasonic testing. The test piece 110 is the objective target of the ultrasonic testing performed within the ultrasonic testing environment 105. The test piece 110 can be any object for which ultrasonic test data is to be acquired. For example, the test piece 110 can be an internal component of an aircraft engine that is being evaluated for material defects present within the component.

As further shown in FIG. 1, the ultrasonic testing environment 105 includes a controller 115 coupled to a probe assembly 120 and to a processor 145. The controller 115 can include executable instructions, which when executed, cause the ultrasonic probe to generate or receive ultrasonic signals based on a variety of parameters associated with the ultrasonic testing. For example, the controller 115 can execute instructions causing the width of an ultrasonic beam emitted from the ultrasonic probe 125 to be widened or narrowed depending on user provided input. The controller 115 can also include executable instructions, which when executed, adjust the location of the probe assembly 120 and/or the ultrasonic probe 125 as required to perform the ultrasonic testing. Once positioned relative to the test piece 110, the ultrasound probe 125 is configured to emit a transmitted ultrasonic signal 130 in the direction of the test piece 110 and to receive a reflected ultrasonic signal 135.

As further shown in FIG. 1, the ultrasonic testing environment 105 includes a value selector 140 that can be configured to determine a select parameter value within in a large range of values. In some embodiments, the value selector 140 can be configured to determine a parameter from one or more parameters based on user input. In some embodiments, the value selector 140 can be configured outside of the ultrasonic testing environment 105. The value selector 140 includes a processor 145 and a memory 150. The processor 145 includes executable instructions, which when executed, perform processing associated with performing ultrasonic testing such as transmitting instructions to the controller 115 or receiving data from the controller 115 associated with the positioning or location of the probe assembly 120 and/or the ultrasonic probe 125. The processor 145 can execute instructions causing the controller 115 to adjust or configure one or more parameters associated with the operation of the probe assembly 120 and/or the ultrasonic probe 125. Additionally, or alternatively, the processor 145 can execute instructions causing the controller 115 to receive data characterized by one or more parameters associated with the transmitted ultrasonic signals 130 and/or the reflected ultrasonic signals 135 and provide the received data to the processor 145.

As shown in FIG. 1, the value selector 140 includes a memory 150 coupled to the processor 145. The memory 150 includes non-transitory computer readable instructions which when executed cause the processor 145 to perform operations to determine a precise value selection of a parameter from a large range of values. In some embodiments, the memory 150 includes non-transitory computer readable instructions, which when executed cause the processor 145 to determine a selected parameter. The memory 150 can store and provide to the processor 145 a variety of data associated with the ultrasonic testing performed via the ultrasonic testing environment 105, including but not limited to, data associated with transmitted ultrasonic signals 130, reflected ultrasonic signals 135, the positioning of the probe assembly 120 and/or the ultrasonic probe 125 positioning, operational parameters of the probe assembly 120 and/or the ultrasonic probe 125, as well as user or system defined configuration parameters associated with providing the data to an input device, such as the input device 155 or to a display, such as the display 160.

As further shown in FIG. 1, the system 100 includes an input device 155 coupled to the processor 145. In some embodiments, the input device 155 can be configured within the ultrasonic testing environment 105 or within the value selector 140. The input device 155 can include a variety of input mechanisms allowing a user to provide inputs for use in determining and selecting a precise value from among a large range of values, as well as for use in determining a selected parameter from one or more parameters associated with the operation of the ultrasonic testing environment 105. In some embodiments, the input device 155 can include a mouse, a keyboard, a stylus, a microphone, a touchscreen or other suitable input mechanisms capable of receiving user inputs and providing the inputs to the processor 145.

As further shown in FIG. 1, the system 100 includes a display 160 coupled to the processor 145. In some embodiments, the display 160 can be configured within the ultrasonic testing environment 105. In other embodiments, the display 160 can be configured within the value selector 140. In some embodiments, the display 160 can also be configured to include a touchscreen input device 155 and can further include additional input devices 155 such as a mouse or stylus for use Interacting with the touchscreen input device configured within the display 155. The display 160 can include one or more user interfaces displaying a variety of data and user interface controls that are associated with the ultrasonic testing being performed in the ultrasonic testing environment 105. The user interface controls provided in the display 160 can include controls implanted in a touchscreen to allow a user to select a precise value within a large range of values and/or to determine a parameter associated with the ultrasound testing performed in the ultrasonic testing environment 105.

Figure 2:
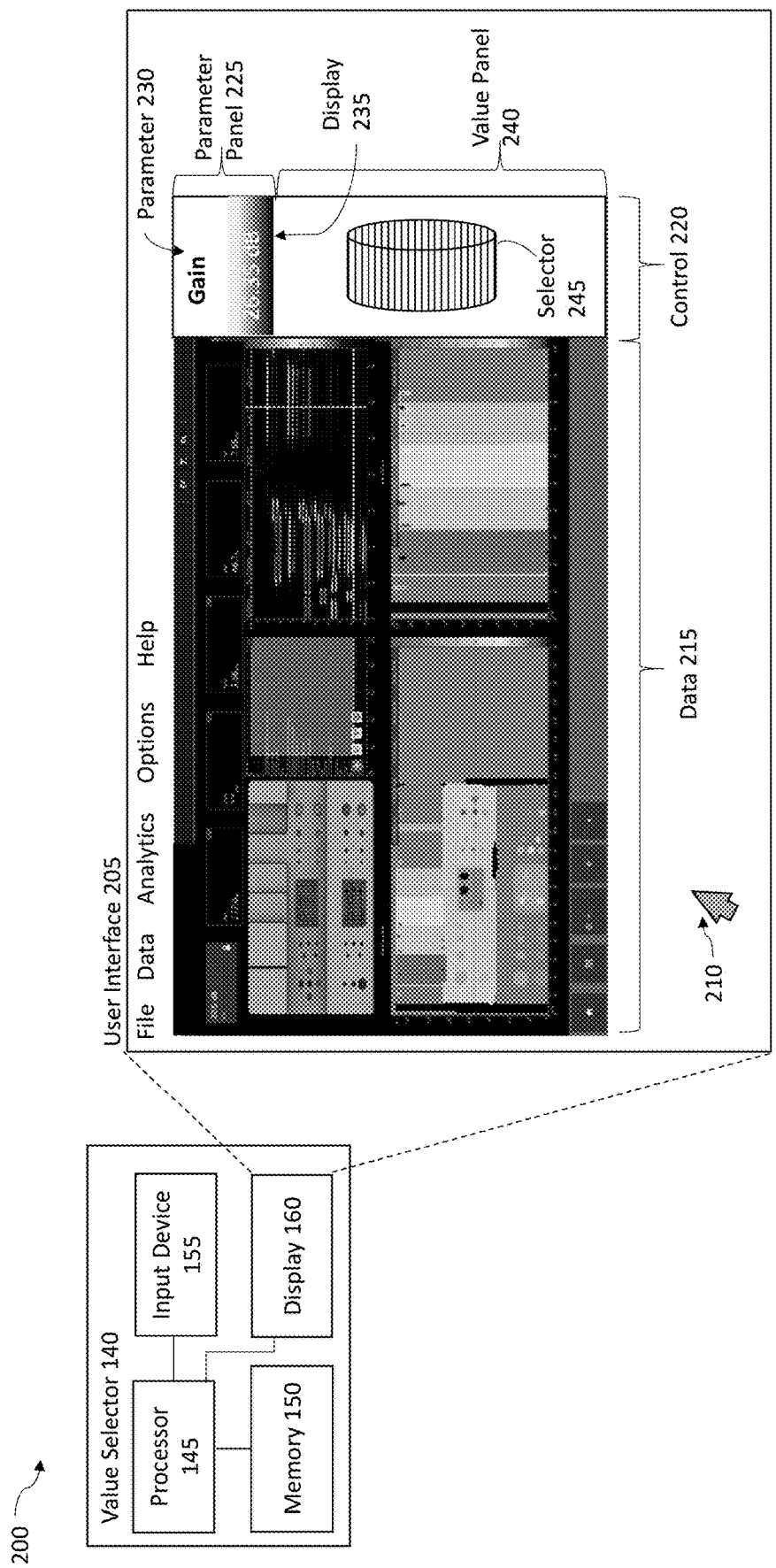
FIG. 2 illustrates an exemplary embodiment of a user interface configured to select a precise value within a large value range.

FIG. 2 illustrates an exemplary embodiment of a user interface 205 configured to select a precise value within a large value range. As shown in FIG. 2, the value selector 140 described in relation to the system 100 of FIG. 1 is configured to include a processor 145 and a memory 150. The value selector 140 shown in FIG. 2 is further configured to include the input device 155 and the display 160 coupled to the processor 145. As shown in FIG. 2 via dashed lines, the user interface 205 is provided for display to a user via display 160. The user can interact with the user interface 205 via an input device, such as a mouse controlling the position of the cursor 210. The user interface 205 is provided in display 160 as a touchscreen interface that includes a portion configured to display data 215 and also includes a control 220.

As shown in FIG. 2, the control 220 is configured to display parameter information and to receive user inputs to select a precise value within a large range of values associated with a parameter corresponding to the gain of the ultrasonic probe 125 described in relation to FIG. 1. In ultrasonic testing, gain refers to a parameter associated with a measure of strength of the transmitted ultrasonic signals 130 and is measured in units of decibels (e.g., dB). The control 220 includes a parameter panel 225 which can include a parameter identifier 230 and a parameter value display 235. The parameter panel 225 can be an interactive portion of the control 220 and can include a multi-state display that is capable of providing dynamic or static displays of parameter identifiers 230 and/or parameter value displays 235 based on tile speed of a user's horizontal touch gesture.

The parameter identifier 230 identifies the specific parameter being manipulated in the ultrasonic testing environment 105 for which the user can select a precise parameter value. In some embodiments, the parameter panel 225 can be configured to enable a user to select one parameter from among many parameters by inputting touch gestures to the parameter panel 225. The parameter panel 225 can be configured to determine an appropriate parameter or sequence of parameters to display based on the direction and speed of the inputted touch gesture. For example, a user can use his or her finger, a stylus, or the cursor 210 to apply an input gesture in a horizontal motion across the parameter panel 225 to view additional parameters that are configurable within the user interface 205. The speed of the user's horizontal touch gesture can be fast, such as that associated with a swipe-type gesture, or slow, such as that associated with a drag-type gesture. For example, in one embodiment, a fast, swipe-type horizontal gesture can cause the parameter identifier 230 to dynamically display multiple parameters in a sequence of one or more parameters. In another embodiment, a slow, drag-type horizontal gesture applied to the parameter panel 225 can cause the parameter identifier 230 to display individual parameters statically in a sequence responsive to each applied horizontal drag-type gesture. Accordingly, the rate of display of the one or more parameters that can be dynamically displayed in the parameter panel 225 can be determined based on the speed of the horizontal input provided by a user. Additionally, or alternatively, in some embodiments, the parameter panel 225 can be configured with a friction parameter, that is configured by a user, to display the sequence of successive parameters at a predefined rate.

In some embodiments, upon initially providing a fast, swipe-type horizontal gesture to the parameter panel 225 thus causing the parameter identifier 230 to display a sequence of one or more parameters as a dynamic display of individual parameters in a sequence, a user can further provide a tap-type gesture to the parameter panel 225. Upon receiving a tap-type gesture, the parameter panel 225 is configured to cease providing the dynamic display of parameters and instead provide a static display of a selected parameter. The selected parameter is determined, in these embodiments, as the parameter identifier 230 that was displayed at the time the tap-gesture was received from the user.

The parameter value display 235 is a multi-state display that is configured to provide a dynamic presentation of the range of parameter values being explored by a user and to display a static presentation of the precise parameter value that a user has selected. As shown in FIG. 2, the user has selected a precise value of 26.35 dB for the Gain parameter. The presentation of the parameter value display 235 can be either a dynamic display or a static display based on a user's interaction with the value panel 240.

As further shown in FIG. 2, the control 220 includes a value panel 240 which further includes a selector 240. In some embodiments, the value panel 240 can be an interactive portion of the control 220 that can be configured similarly to the parameter panel 225, described above, such that the speed of a user's horizontal touch gesture that is applied to the value panel 240 can cause the control 220 to provide a dynamic display of a sequence of one or more parameters in the parameter panel 225 (e.g., responsive to a fast, swipe-type gesture) or to provide a static display of individual parameters in the parameter panel 225 (e.g., response to one or more slow, drag-type gestures).

The selector 245 is configured to receive input gestures and to select a value associated with the parameter that is displayed in the parameter panel 225. In some embodiments, the selector 245 can receive touch gestures to select the value. In other embodiments, the selector 245 can receive inputs provide via the cursor 210. The selector 245 can emulate a rotary knob or dial that provides the user with a user experience similar to that of rotating or turning a knob to select a precise parameter value. For example, a user can apply a touch gesture in an upward vertical direction to the selector 245 causing the selector 245 to rotate or spin in a clockwise direction to indicate a larger (or greater) parameter value selection is being sought by the user. As a result of an upward vertical touch gesture applied to the selector 245, the parameter value display 235 would provide a dynamic display of increasing parameter vales. Similarly, a user can apply a touch gesture in a downward vertical direction to the selector 245 causing the selector 245 to spin or rotate in a counter-clockwise direction to indicate a smaller (or lesser) parameter value selection is being sought by the user. As a result of a downward vertical touch gesture applied to the selector 245, the parameter value display 235 would provide a dynamic display of decreasing parameter vales.

The selector 245 can be configured to determine the complete range of values associated with a parameter, and based on the speed and direction of the user input can adjust the display of the parameter values displayed in parameter value display 235 accordingly. For example, the selector 245 can determine that the complete range of parameter values for the Gain parameter is a range of values from 0.0 dB to 200.0 dB. Assuming the parameter value display 235 identifies a starting parameter value of 26.35 dB (as shown in FIG. 2), upon receiving a very fast, swipe-type vertical touch gesture in an upward direction, the selector 245 can determine a sub-set of parameter values that are closer in proximity to the maximum range value. In this example, upon application of the very fast, swipe-type vertical touch gesture to the selector 245, the selector can determine that the next parameter value to be provided in parameter value display 235 is 100.0 dB. Continuing this example, upon application of a less fast, swipe-type vertical touch gesture in an upward direction, the selector 245 can determine that the next parameter to be provided in parameter value display 235 is 150.0 dB. If a user them applied a slow, drag-type vertical touch gesture, the selector 245 can determine the next parameter value to be provided in parameter value display 235 is 160.0 dB. In this way, the selector 245 can determine sub sets of parameter values that should be incrementally displayed in the parameter value display 235 based on the speed of the user inputs that are applied to the selector 245. A user seeking to configure the Gain parameter to a setting of 165.0 dB can thus provide one or more touch gestures to precisely select the desired Gain parameter value.

Although the foregoing example, describes upward vertical touch gestures to select a precise parameter value that is greater than the initially displayed parameter value, the selector 245 can be configured to similarly determine sub sets of parameter values based on downward vertical touch gestures. For example, continuing the previous example, a user seeking to change the parameter value to 160.0 dB (from the previously selected value of 165.0 dB) could apply a downward vertical touch gesture to the selector 245 at an input speed corresponding to a drag-type gesture. Based on this user input, the selector 245 can determine smaller sub-sets of parameter values to display, such as increments of single decibels. As the user incrementally applied drag type downward vertical touch gestures, the selector 24) would determine the parameter values to be displayed as 164.0 dB, 163.0 dB, 162.0 dB, 161.0 dB, etc., until user had provided a final input corresponding to the desired parameter value to be selected (e.g., 160.0 dB).

In some embodiments, the selector 245 can be configured with a configurable friction parameter. The friction parameter can determine the rate at which the successive parameter values are displayed as a dynamic display in the parameter value display 235. Additionally, or alternatively, the configurable friction parameter can be configured to determine the rate at which the selector 245 rotates or spins in response to touch gestures applied at varying input speeds. The configurable friction parameter can be configured in relation to sub-sets of parameter values as well as incremental, successive parameter values in the range of parameter values. For example, in FIG. 2, a configurable friction parameter can be enabled under the "Options" menu item and allow a user to configure the increments or sub-sets of parameter values to be displayed when a user provides a fast, swipe-type vertical upward touch gestures. In some embodiments, the configurable friction parameter can be configured to increase the parameter values by increments or sub-sets of 10s, 20s, 50s or even 100s. Similarly, in some embodiments, the configurable friction parameter can be configured for slower, drag-type upward touch gestures. In other embodiments, the configurable friction parameter can be similarly configured for downward touch gestures that are either swipe-type touch gestures or drag-type touch gesture and can result in decreasing parameter values by the increments or sub-sets defined via the configurable friction parameters. In this way, the control 220 can be configured to enable precise selection of parameter values within large ranges and thereby provide an enhanced user experience.

Figure 3:
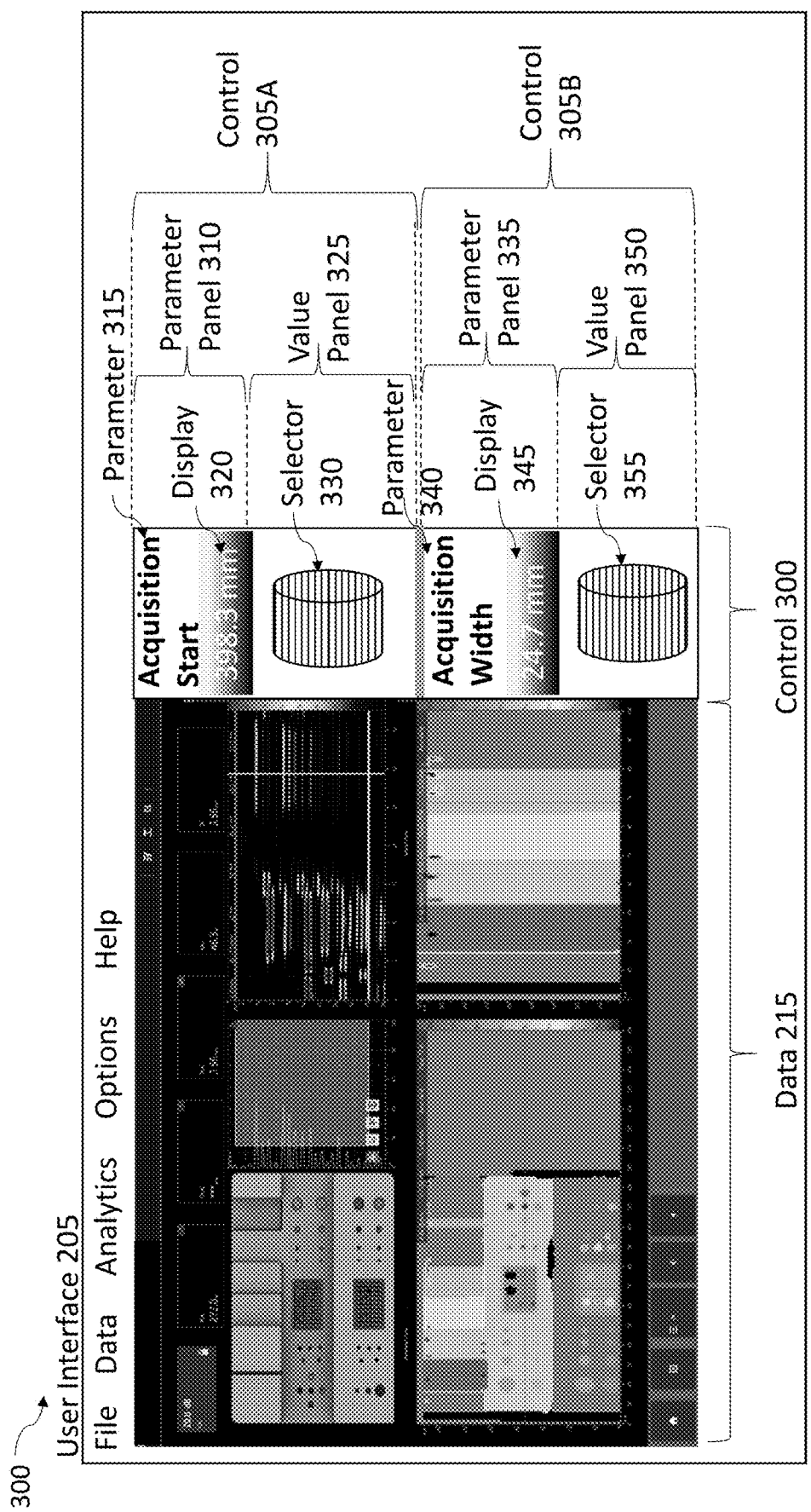
FIG. 3 illustrates another exemplary embodiment of a user interface configured to select a precise value within a large value range.

FIG. 3 illustrates another exemplary embodiment of a user interface configured to select a precise value within a large range of values. As shown in FIG. 3, the user interface 205 includes components similar to those shown and described in relation to the user interface 205 of FIG. 2, except the control 300 shown in FIG. 3 includes multiple controls, e.g., controls 305A and 305B. The user interface 205 of system 100 can be configured with one or more single controls 200 as shown in FIG. 2, or with one or more multiple control 300 as shown in FIG. 3.

As shown in FIG. 3, the control 305A can be configured to receive user inputs for determining a precise value selection for a first parameter, e.g., an acquisition start parameter. For example, as shown in FIG. 3, the control 305A includes a parameter panel 310 including a parameter identifier 315 and a parameter value display 320 as well as an value panel 325 including a selector 330. As further shown in FIG. 3, the control 305B can be configured to receive user inputs for determining a precise value selection for a second parameter, e.g., an acquisition width parameter. The control 305B includes a parameter panel 335 including a parameter identifier 340 and a parameter value display 345. The control 305B also includes an value panel 350 including a selector 355. Controls 305A and 305B can be configured to operate independently of each other. Additionally, or alternatively, the controls 305 can be configured to interoperate with each other such that parameter value selections determined using control 305A can influence or affect the range of selectable parameter values configured in relation to control 305B.

Figure 4:
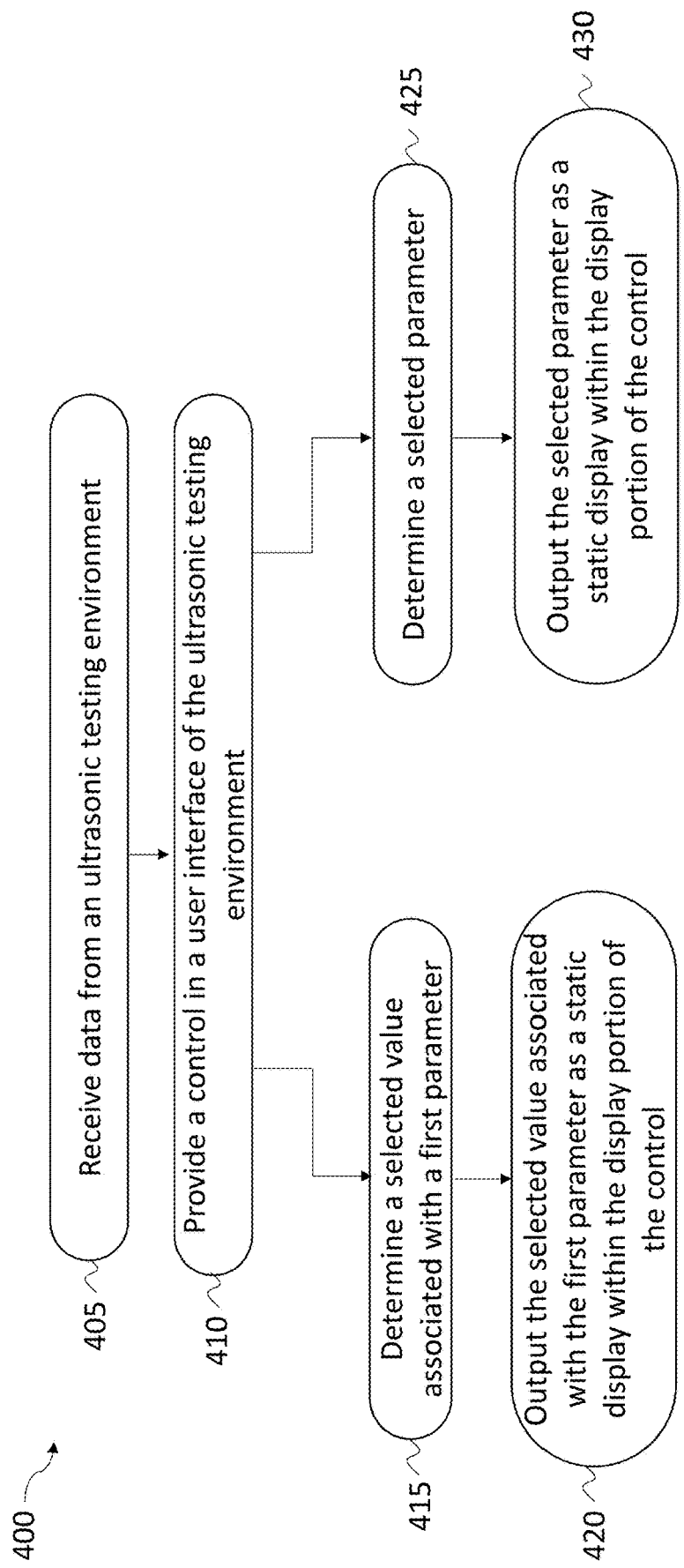
FIG. 4 is a flow diagram illustrating an exemplary embodiment of a method for selecting a precise value within a large value range.

FIG. 4 is a flow diagram illustrating an exemplary embodiment of a method 400 for selecting a precise value within a large value range using the system 100 shown and described in relation to FIG. 1 and the user interface 205 shown and described in relation to FIG. 2. In certain aspects, embodiments of the method 400 can include greater or fewer operations than illustrated in FIG. 4 and the operations can be performed in a different order titan illustrated in FIG. 4.

In operation 405, the value selector 140 receives data from an ultrasonic testing environment, such as the ultrasonic testing environment 105. The received data can include data characterized by one or more parameters that are associated with performing ultrasonic testing. For example, the parameters can include the frequency or bandwidth of transmitted ultrasonic signals 130, the beam angle of the transmitted ultrasonic signal 130, the gain of the transmitted ultrasonic signals 130, the pulse energy of the ultrasonic signals 130, the acquisition start position of the ultrasonic probe 125 and the acquisition width of the transmitted ultrasonic signals 130. In some embodiments, the parameters can include parameters associated with a gate start, a gate end, a gate threshold, a material velocity, a cursor position, a calibration distance, a material thickness, an overlay position and an overlay size. The received data can include minimum and maximum values for each parameter and the value selector 140 can be configured to determine the range of the parameter values for which a user can provide input via the user interface 205 in order to precisely select a parameter value from within the range of values.

In operation 410, the value selector 140 provides a control 220 in a user interface 205 of the ultrasonic testing environment 105. Based on the received data, the value selector 140 can determine the range of values associated with the one or more parameters and can execute instructions to configure the control 220 to display parameter data associated with the one or more parameters in the parameter panel 225. For example, the value selector 140 can be configured to display each of the one or more parameter names in the parameter identifier 230. Additionally, or alternatively, the value selector 140 can configure the parameter value display 235 to display only those parameter values that are within the range of values determined from the data received in operation 405.

In operation 415, the value selector 140 determines a selected value associated with a first parameter. A user can provide user inputs via the selector 245 to select a precise value associated with the first parameter. In some embodiments, the user provides input to select the precise value by applying touch gestures to an input device 155, such as a touchscreen, that is configured to display the user interface 205 and the control 220. In other embodiments, the user provides input via an input device 155, such as a mouse, that is communicatively coupled to the value selector 140 and a display 160 in which the user interface 205 and control 220 are provided to the user. Based on the speed and direction of the touch gestures or the mouse inputs applied to the selector 245, the value selector 140 determines the selected value. Additional detail regarding the methods for determining the selected value associated with a parameter will be provided in the discussion of FIG. 5.

In operation 420, the value selector 140 outputs the selected value associated with the first parameter as a static display within the display portion 225 of the control 220. The value selector 140 processes the applied user inputs to determine the selected value. The value that has been selected by the user is displayed in the parameter value display 235 as a static display. The selected value is the parameter value that the value selector 140 can use to configure the component in the ultrasonic testing environment 105 to which the parameter corresponds. In this way, the user can select a precise parameter value in order to configure or adjust the settings of the ultrasonic testing environment 105.

In operation 425, the value selector 140 determines a selected parameter. The user can provide user inputs vie the parameter panel 225 and/or the value panel 240 to select a parameter from the one or more parameters included in the received data. For example, upon applying horizontal touch gestures to the parameter panel 225 and/or the value panel 240, the parameter panel 225 will toggle between parameters or sequentially display the one or more parameter corresponding to the data received in operation 405. Additional detail regarding the methods for determining the selected parameter will be provided in the discussion of FIG. 6.

In operation 430, the value selector 140 outputs the selected parameter as a static display within the display portion of the control 220. The value selector 140 can process the applied user inputs describe above in relation to operation 425 to determine the selected parameter. The parameter that has been selected by the user can be displayed in the parameter identifier 230 of the parameter panel 225 as a static display. The selected parameter can then be configured in the ultrasonic testing environment 105 by the value selector 140 based on the precise value of the parameter that was selected by the user via the selector 245.

Figure 5:
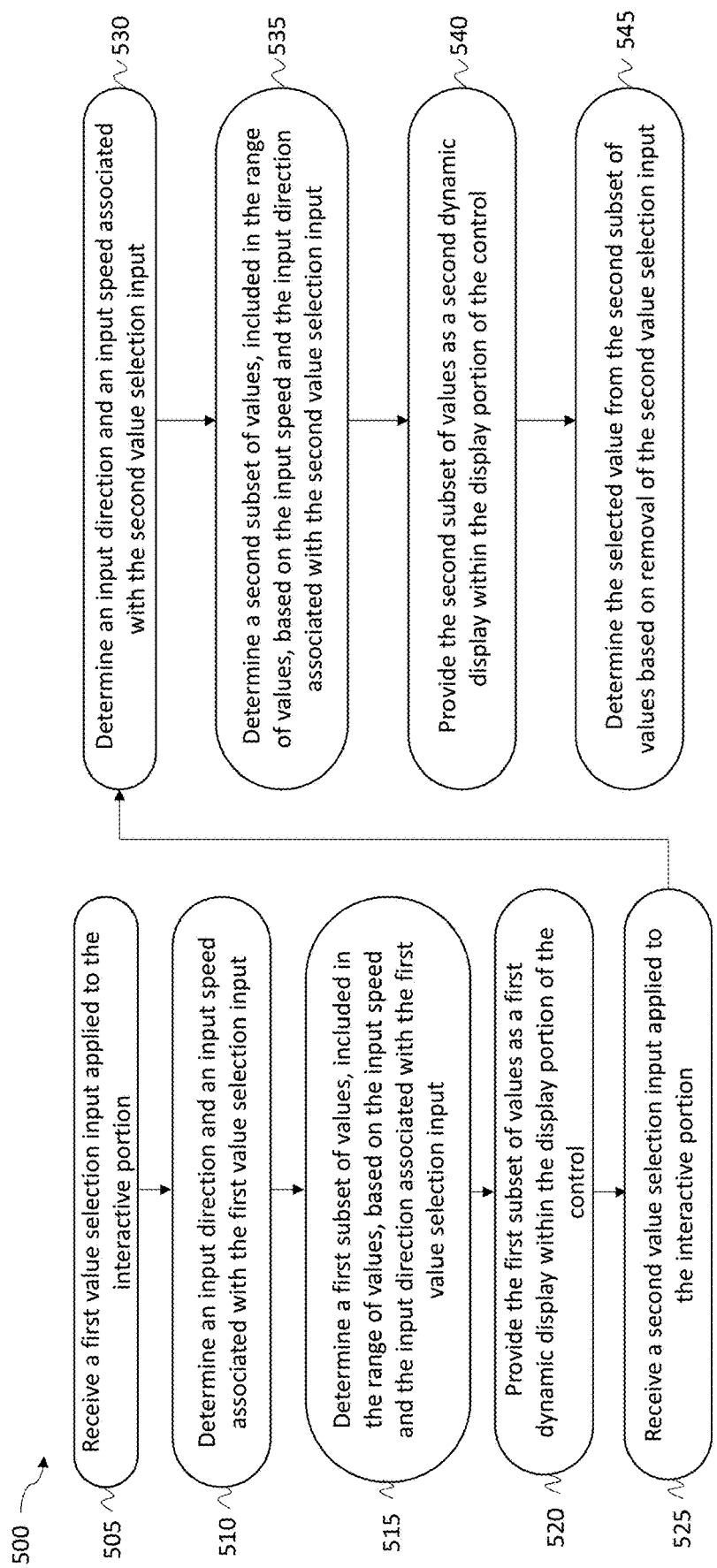
FIG. 5 is a flow diagram illustrating an exemplary embodiment of a method for determining a selected value associated with a parameter.

FIG. 5 is a flow diagram illustrating an exemplary embodiment of a method 500 for determining a selected value associated with a first parameter using the system 100 shown and described in relation to FIG. 1 and the user interface 205 shown and described in relation to FIG. 2. In certain aspects, embodiments of the method 500 can include greater or lever operations than illustrated in FIG. 5 and the operations can be performed in a different order than illustrated in FIG. 5.

In operation 505, the selector 245 receives a first value selection input applied to the interactive portion of the control 220. A user can provide the first value selection input via user inputs such as touch gestures or mouse interactions that the user applies to the selector 245. The selector 245 can be configured to spin or rotate upon application of the user's value selection input.

In operation 510, the selector 245 determines an input direction and an input speed associated with the first value selection input. The user inputs provided as value selection it can be applied to the selector 245 as touch gestures or mouse interactions in a vertical direction. The selector 245 can be configured to execute different functionality based on the input direction. For example, the selector 245 can be configured to determine an increment or subset of parameter values within the parameter range and to display the parameter values that are within the increment or subset. In this way, the selector 245 can be configured to determine and display increments or subsets of parameter values whose values are greater than an initial or previously provided value based on vertical upward touch gestures. Additionally, or alternatively, the selector 245 can be configured to determine and display increments or subsets of parameter values whose values are lower than an initial or previously provided value based on downward vertical touch gestures. The initial value can be the parameter value that is initially displayed when a user begins to interact with the selector 245 for the first time. The previously provided value can be a value that the selector 245 has determined and displayed based on previously provided user input.

The user inputs can also be provided at a variety of input speeds. The selector 245 can be configured to determine input speed based on the duration of contact between a user's finger and the touchscreen. For example, the selector 245 can be configured to determine that a fast, swipe-type gesture includes a short duration of contact between the touchscreen and the user's finger or stylus. Similarly, the selector 245 can be configured to determine that a slow, drag-type gesture includes a longer duration of contact between the touchscreen and the user's finger or stylus. Based on the speed of the user input, the selector 245 can be configure to execute different functionality. For example, in response to fast, swipe-type input speeds, the selector 245 can be configured to determine and display larger increments or subsets of parameter values in one or more magnitudes, such as increments of 10s, 20s, 30s, or 100s. Similarly, in response to slow, drag-type input speeds, the selector 245 can be configured to determine and display smaller increments or subsets of parameter values in one or more magnitudes, such as increments of 1.0, 0.5, 0.1, 0.01, or 0.001, etc. The selector 245 can include configurable settings to adjust or manipulate the magnitude of the increments or subsets of parameter values based on the speed of the user provided input.

In operation 515, the value selector 140 determines a first subset of values, included in the range of values, based on the input speed and the input, direction associated with the first value input selection. As a result of processing the speed and direction of the user inputs applied to the selector 245, the value selector 140 determines the increments or subset of values which correspond to the input direction and the input speed. For example, a user can provide an initial, or first value selection input as a fast, swipe-type touch gesture in a vertical direction. The value selector 140 can determine that the subset of values should be incremented higher or greater by a magnitude of 50 as compared to the starting value that was initially displayed in the parameter value display 235. In this example, assuming the initial parameter value was 0.0, based on the user's first input of a fast, swipe-type touch gesture in the vertical direction, the value selector 140 can determine the new incremental value to be 50.0.

In operation 520, the value selector 140 provides the first subset of values as a first dynamic display within the display portion of the control 220. The first increment or subset of values determined in operation 520 can be provided to the user in the parameter value display 235 of the parameter panel 225. The displayed value can be provided as a dynamic display such that parameter values that are in proximity to the magnitude of the first determined subset of values are displayed in sequence dynamically. Continuing the example above, based on the user's first input of a fast, swipe-type touch gesture in the vertical direction, the value selector 140 can provide a dynamic display of the values which are in proximity to 50.0, such as successive displays of 45.0, 46.0, 47.0, 48.0, 49.0 and finally reverting to a static display of 50.0.

In operation 525, the selector 245 receives a second value selection input applied to the interactive portion. Similar to the functionality described in relation to operation 505, the selector 245 receives an additional, second, or subsequent user input as a second value selection input that can be provided by inputting one or more touch gestures. The user can enter second or additional user inputs to the selector 245 in order to operate the control 220 to select the precise parameter value for which the user is attempting to select. Continuing the above example, upon providing a first value selection input causing the control 220 to display a value or 50.0 in the parameter value display 235, the user can enter a second or additional value selection input to continue selecting the desired, precise parameter value. For example, assume the user is attempting to precisely select a parameter value of 64.0. The user can provide a second value selection input as a less-fast, swipe-type touch gesture in the upward vertical direction.

In operation 530, the selector 245 determines an input direction and an input speed associated with the second value selection input. Similar to the functionality described in relation to operation 510, the selector 245 can determine the input speed and the input direction of user inputs that are provided as second or additional value selection inputs as the user attempts to select the precise parameter value. Continuing the above example, the selector 245 can be configured to determine that a less fast, swipe-type touch gesture input in an upward vertical direction corresponds to smaller increments or subsets of parameter values, such as increments or subsets of parameter values in magnitudes of 10s.

In operation 535, the value selector 140 determines a second subset of values, included in the range of values, based on the input speed and the input direction associated with the second value selection input. Similar to the functionality described in relation to operation 515, the value selector 140 can determine the second subset of parameter values based on the second or an additional user input applied to the selector 245. Continuing the above example, the value selector 140 can determine, based on receiving a less-fast, swipe-type touch gesture input in an upward vertical direction, the second increment or subset of parameter value to be 60.0. The value selector 140 determined the second subset of values to be 60.0 as a result of the first user input applied as a fast, swipe-type gesture in a upward vertical direction corresponding to an increment of 50.0 which was followed by a second user input applied as a less-fast, swipe type gesture in a vertical upward direction corresponding to an increment of 10.0.

In operation 540, the value selector 140 provides the second subset of values as a second dynamic display within the display portion of the control. Similar to the functionality described in relation to operation 520, the value selector 140 can provide the determined second subset of parameter values for display in the parameter value display 235 as a dynamic display. The displayed value can be provided as a dynamic display such that parameter values that are in proximity to the magnitude of the second determined subset of values are displayed in sequence dynamically. Continuing the example above, based on the user s second input of a less-fast, swipe-type touch gesture in the vertical direction, the value selector 140 can provide a dynamic display of the values which are in proximity to 60.0, such as successive displays of 57.0, 58.0, 59.0, and finally reverting to a static display of 60.0.

A user may continue to provide additional second value selection inputs in an iterative manner until the precise value to be selected is reached. For example, after entering the aforementioned swipe-type touch gestures in a vertical direction, the user may transition to entering drag-type touch gestures in a vertical direction in order to precisely select the desired parameter value. As described above, the value selector 140 can be configured to determine that drag-type touch gestures applied in a vertical direction correspond to minor increments or subsets of parameter values in magnitudes such as 1.0, 0.5, 0.1, 0.01, etc. As the user continues to provide drag-type gestures in an upward vertical direction the value selector 140 can determine a corresponding increment or subset of the parameter values to display in the parameter value display 235 as a sequence of static displays, such as 61.0, 62.0, 63.0, until a final user input is provided to reach the desired parameter value to be selected of 64.0.

In operation 545, the value selector 140 determines the selected value from the second subset of values based on removal of the second value selection input. The value selector 140 can determine the selected value based on determining that the second value input has been removed from the touchscreen. For example, a drag-type touch gesture can be initiated by pressing a finger to the touch screen. The drag-type gesture is performed in a particular direction and at a particular speed. The drag-type gesture ends as the finger is removed from the touchscreen. The control 220 can be configured to determine the removal of a user input, such as the second value selection input, based on an absence of pressure or force applied to the control 220. In some embodiments, the value selector 140 can be configured to determine the removal of the second value selection input based on a duration of time passing before any subsequent user input is applied to the selector 245.

Figure 6:
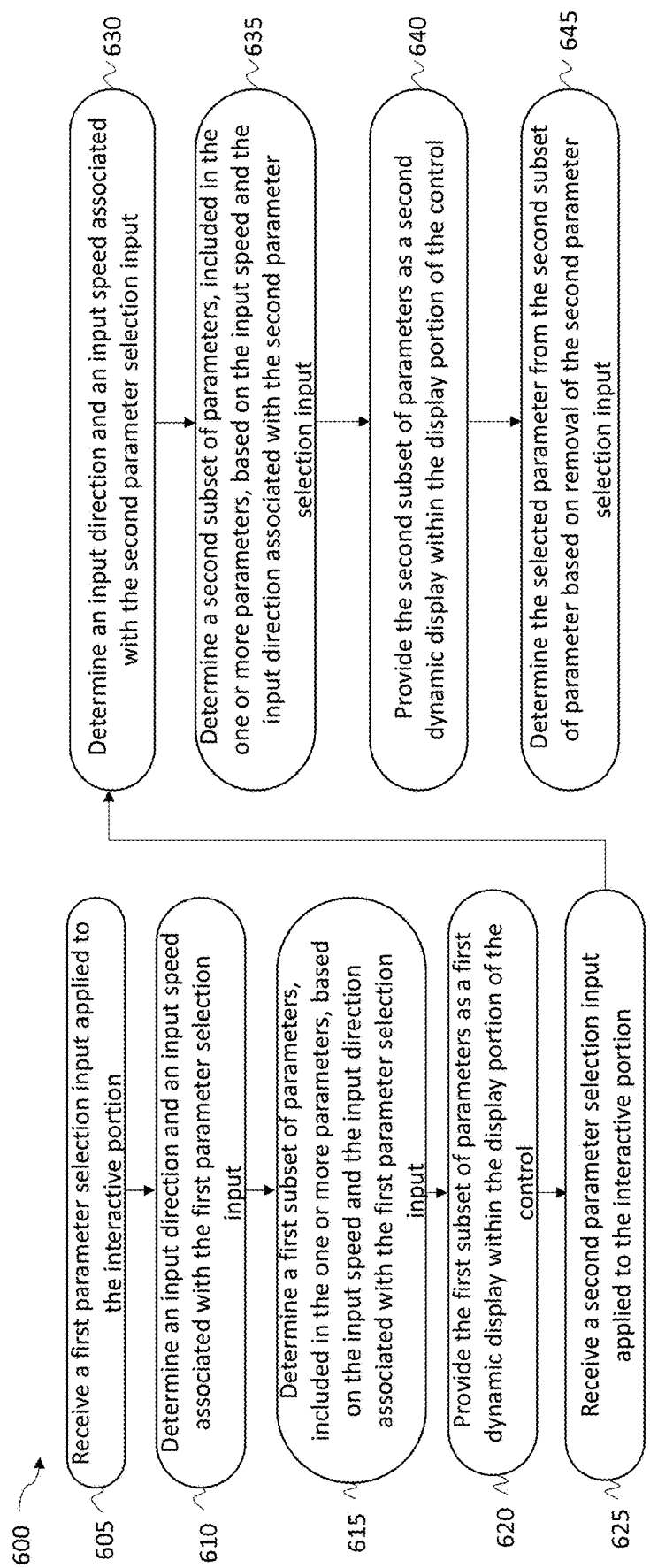
FIG. 6 is a flow diagram illustrating an exemplary embodiment of a method for determining a selected parameter.

FIG. 6 is a flow diagram illustrating an exemplary embodiment of a method 600 for determining a selected parameter using the system 100 shown and described in relation to FIG. 1 and the user interface 205 shown and described in relation to FIG. 2. In certain aspects, embodiments of the method 600 can include greater or fewer operations than illustrated in FIG. 6 and the operations can be performed in a different order than illustrated in FIG. 6.

In operation 605, a first parameter selection input is applied to the interactive portion of the control 220. The interactive portion(s) of the control 220 can include the parameter panel 225, as well as the value panel 240. A user can provide a first parameter selection input as a horizontal touch gesture that is applied to the parameter panel 225 or the value panel 240.

In operation 610, the control 220 determines an input direction and an input speed associated with the first parameter selection input. The user inputs provided as parameter selection inputs can be applied to the control 220 as touch gestures in a horizontal direction. The control 220 can be configured to execute different functionality based on the input direction. For example, the control 220 can be configured to determine that a swipe or drag-type touch gesture applied in a horizontal direction to the left can advance a sequence of parameter panel 225 displays in a first direction. Similarly, a swipe or drag-type touch gesture applied in a horizontal direction to the right can advance a sequence of parameter panel 225 displays in a second direction.

The control 220 can be further configured to determine an input speed associated with the first parameter input selection. The control 220 can be configured to determine that a fast, swipe-type horizontal touch gesture has been applied to the control 220 causing a dynamic display of multiple sequential parameters to be displayed in the parameter panel 225. In some embodiments, the control 220 can be configured to determine a slow, drag-type horizontal touch gesture has been applied to the control 220 causing a static display of individual parameters to be provided in a sequence, such that each successive drag-type horizontal touch gesture causes the successive individual parameters to be displayed in the parameter panel 225. The control 220 can include configurable settings to adjust or manipulate the rate at which the parameters are displayed based on the speed of the user provided input.

In operation 615, the value selector 140 determines a first subset of parameters, included in the one or more parameters, based on the input speed and the input direction associated with the first parameter input selection. As a result of processing the speed and direction of the user inputs, the value selector 140 determines the increments or subset of parameters which correspond to the input direction and the input speed. For example, a user can provide an initial, or first parameter selection input as a fast, swipe-type touch gesture in a horizontal direction to the right. As a result, the value selector 140 can determine that the first subset of parameters corresponds to a subset of parameters that are indexed later in an ordered list of the one or more parameters. In this example, assuming the initial parameter had an index of n=1, based on the user's first input of a fast, swipe-type touch gesture in the horizontal direction to the right, the value selector 140 can determine the first subset of parameters to begin at an index of n=5.

In operation 620, the value selector 140 provides the first subset of parameters as a first dynamic display within the display portion of the control 220. The first increment or subset of parameters determined in operation 620 can be provided to the user in the parameter identifier 230 of the parameter panel 225. The displayed parameters can be provided as a dynamic display such that parameters that are in proximity to the index of the first determined subset of parameters are displayed in sequence dynamically. Continuing the example above, based on the user's first input of a fast, swipe-type touch gesture in the horizontal direction to the right, the value selector 140 can provide a dynamic display of the parameters which are in proximity to the parameter with an index of n=5, such as successive displays of parameters associated with indexes n=2, n=3, and n=4 and finally reverting to a static display of the parameter with an index of n=5.

In operation 625, the control 220 receives a second parameter selection input applied to the control 220. Similar to the functionality described in relation to operation 605, the control 220 receives an additional, second, or subsequent user input as a second parameter selection input that can be provided by inputting one or more touch gestures. The user can enter second or additional user inputs to the control 220 in order to select the precise parameter. Continuing the above example, upon providing a first parameter selection input causing the control 220 to display a parameter with an index of n=5 in the parameter panel 225, the user can enter a second or additional parameter selection input to continue selecting the desired parameter. For example, assume the user is attempting to select a parameter with an index of n=9. The user can provide a second parameter selection input as a slow, drag-type touch gesture in the horizontal direction to the right.

In operation 630, the control 220 determines an input direction and an input speed associated with the second parameter selection input. Similar to the functionality described in relation to operation 610, the control 220 can determine the input speed and the input direction of user inputs that are provided as second or additional parameter selection inputs as the user attempts to select the precise parameter. Continuing the above example, the control 220 can be configured to determine that a slow, drag-type touch gesture input in a horizontal direction to the right corresponds to smaller increments or subsets of parameters, such as increments or subsets of parameter in single index values.

In operation 635, the value selector 140 determines a second subset of parameters, included in the one or more parameters, based on the input speed and the input direction associated with the second parameter selection input. Similar to the functionality described in relation to operation 615, the value selector 140 can determine the second subset of parameters based on the second or an additional user input applied to the control 220. Continuing the above example, the value selector 140 can determine, based on receiving a slow, drag-type touch gesture input in a direction to the right, the second increment or subset of parameters to be the parameter with an index of n=6. The value selector 140 determined the second subset of parameter to be the parameter with an index of n=6 as a result of the first user input applied as a fast, swipe-type gesture in a horizontal direction to the right corresponding to a parameter with an index of n=5 which was followed by a second user input applied as a slow, drag-type gesture in a horizontal direction to the right corresponding to an increment of a single index value.

In operation 640, the value selector 140 provides the second subset of parameters as a second dynamic display within the parameter panel 225. Similar to the functionality described in relation to operation 620, the value selector 140 can provide the determined second subset of parameters for display in the parameter identifier 230 as a dynamic display. The displayed value can be provided as a dynamic display such that parameters that are in proximity to the index of the second determined subset of parameters are displayed in sequence dynamically. Continuing the example above, based on the user's second input of a slow, drag-type touch gesture in the horizontal direction to the right, the value selector 140 can provide a dynamic display of the parameter with an index of n=6.

A user may continue to provide additional second parameter selection inputs in an iterative manner until the desired parameter to be selected is reached. For example, after entering the aforementioned swipe-type touch gestures in a horizontal direction, the user may transition to entering drag-type touch gestures in a horizontal direction to the right in order to select the desired parameter. As described above, the value selector 140 can be configured to determine that drag-type touch gestures applied in a horizontal direction to the right correspond to minor increments or subsets of parameters in single index magnitudes. As the user continues to provide drag-type gestures in an horizontal direction to the right the value selector 140 can determine a corresponding increment or subset of the parameters to display in the parameter identifier 230 as a sequence of static displays, such as parameters with an index of n=7, and n=8, until a final user input is provided to reach the desired parameter to be selected with an index of n=9.

In operation 645, the value selector 140 determines the selected parameter from the second subset of parameters based on removal of the second parameter selection input. The value selector 140 can determine the selected parameter based on determining that the second parameter input has been removed from the touchscreen. For example, a drag-type touch gesture can be initiated by pressing a finger to the touch screen. The drag-type gesture is performed in a particular direction and at a particular speed. The drag-type gesture ends as the finger is removed from the touchscreen. The control 220 can be configured to determine the removal of a user input, such as the second parameter selection input, based on an absence of pressure or force applied to the control 220. In some embodiments, the value selector 140 can be configured to determine the removal of the second parameter selection input based on a duration of time passing before any subsequent user input is applied to the control 220.

Figure 7:
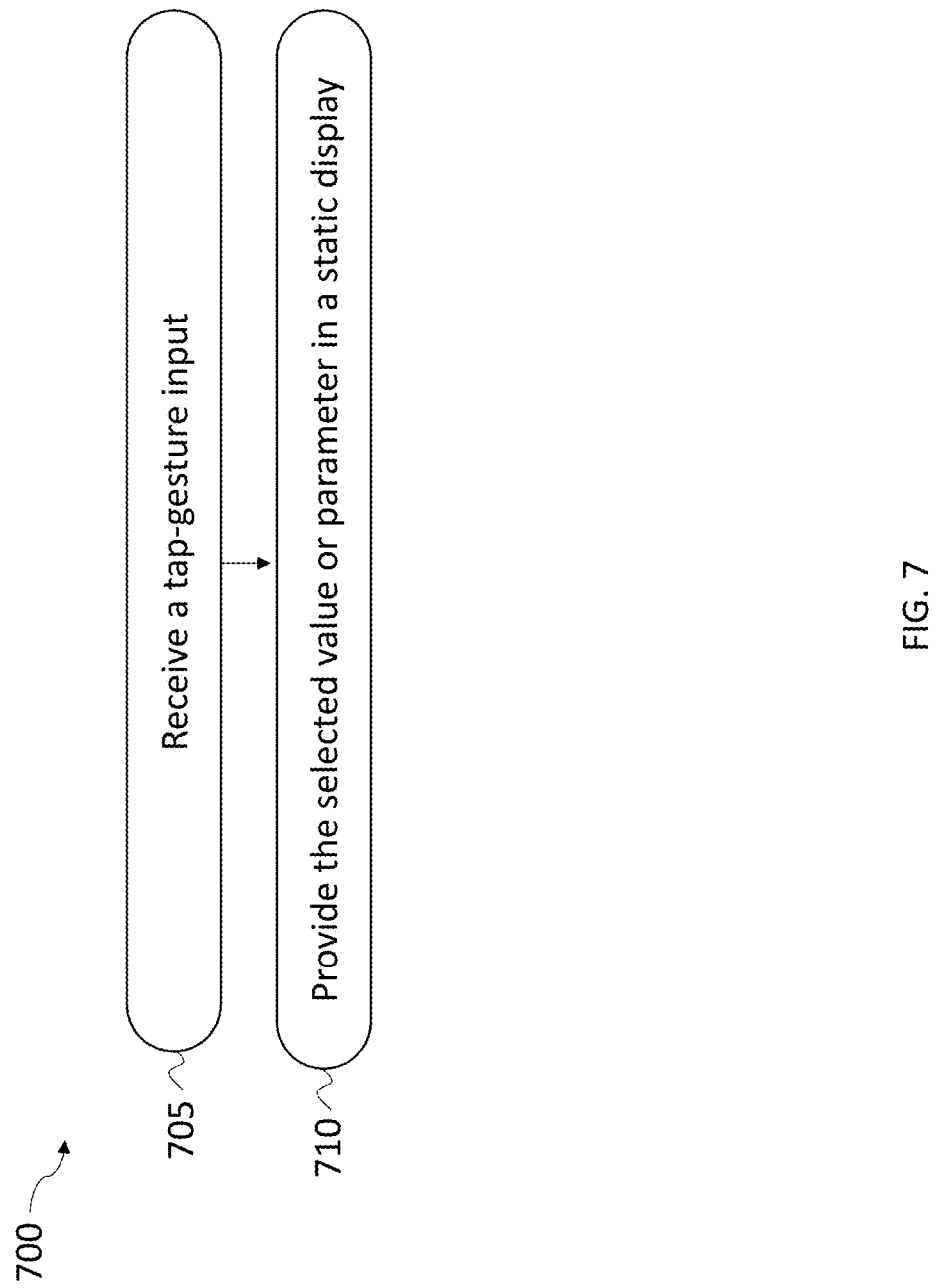
FIG. 7 is a flow diagram illustrating an exemplary embodiment of a method for providing a selected value or parameter in a static display.

FIG. 7 is a flow diagram illustrating an exemplary embodiment of a method 700 for providing a selected value or parameter in a static display using the system 100 shown and described in relation to FIG. 1 and the user interface 205 shown and described in relation to FIG. 2. In certain aspects, embodiments of the method 700 can include greater or fewer operations than illustrated in FIG. 7 and the operations can be performed in a different order than illustrated in FIG. 7.

As described above, the parameter panel 225 and the value panel 240 include interactive portions which can be in a state of dynamic display. For example, based on receiving a swipe-type gesture applied to the parameter panel 225, the parameter panel 225 can provide a dynamic display of the one or more parameters in sequenced order corresponding to the index associated with each parameter. Similarly, the selector 245 configured in the value panel 245 can provide a dynamic display whereby the selector 245 is spinning or rotating as a result of a swipe-type gesture that has been applied to the selector 245 by a user attempting to select a precise parameter value. The control 220 can be configured to receive a tap-gesture causing the state of the dynamic display to transition to a state of static display and thereby causing a particular value or parameter to be selected.

In operation 705, the control 220 receives a tap-gesture input. The tap-gesture can be received upon provision of the first dynamic display described above. In some embodiments, the first dynamic display can correspond to the dynamic display of one or more parameter values generated as a result of applying a first value selection input (e.g., a fast, swipe-type gesture applied in a vertical direction) to the selector 245. In other embodiments, the first dynamic display can correspond to the dynamic display of one or more parameters generated as a result of applying a first parameter selection input (e.g., a fast, swipe-type gesture applied in a horizontal direction). A tap-gesture input can be a gesture in which the user is merely touching the touchscreen without additional movement in a particular direction. A tap-gesture can include a relatively fast input speed as the user is only momentarily touching the touchscreen with a finger or stylus and immediately removing the finger or stylus.

In operation 710, the control 220 provides the selected value or parameter in a static display. Responsive to receiving a tap-gesture, the control 220 can be configured to provide the selected value or parameter in a static display. The value or parameter to be provided is determined as the value or parameter that was displayed in the parameter value display 235 or the parameter identifier 230 at the time the tap-gesture was received. In this way, a user can interact with the control 220 to indicate a precise value or a specific parameter to be selected when a dynamic display of values or parameters are being displayed in the control 220.

Figure 8:
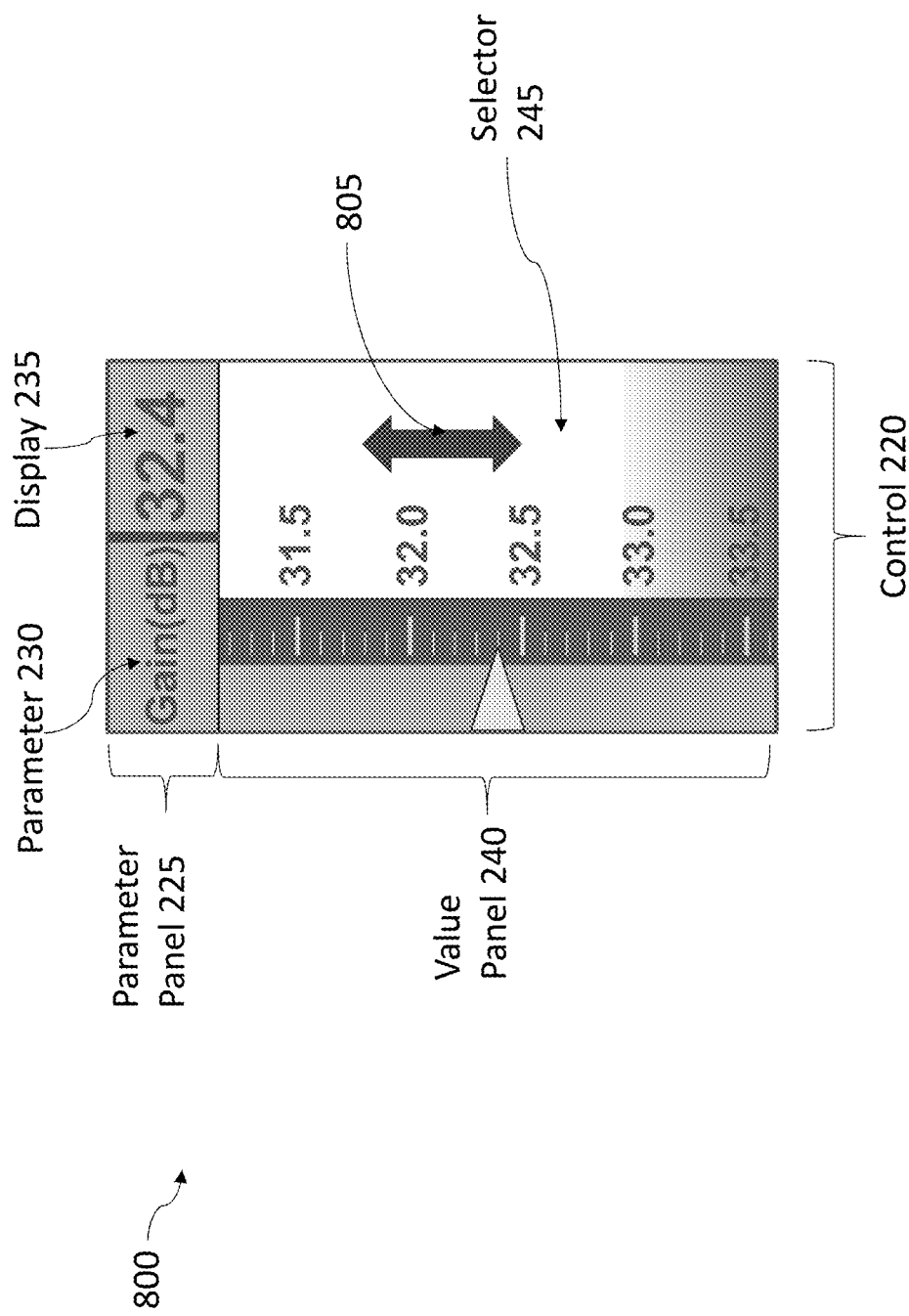
FIG. 8 illustrates an exemplary embodiment of a user interface for selecting a precise value within a large value range in operation.

FIG. 8 illustrates an exemplary embodiment of a user interface 800 for selecting a precise value within a large value range in operation. The user interface 800 includes a control 220, as described in relation to FIG. 2. The control 220 includes a parameter panel 225, a parameter identifier 230 and parameter value display 235, a value panel 240 and a selector 245.

As shown in FIG. 8, the control 220 has been configured to receive user inputs for selecting a precise value associated with the Gain parameter. The value selector 140 has determined the range of values associated with the Gain parameter and configured the scale of values identified on the selector 245 to correspond to the range of Gain parameter values. A user can apply vertical gestures 805 via touch or using a mouse to adjust the selector 245 to a desired parameter value. For example, a user can apply a fast, swipe-type gesture in an upward vertical direction to select a value higher than 33.5. Additionally, or alternatively, a user can apply a slow, drag-type gesture in a downward vertical direction to select a value that is lower than 32.5. Based on the input speed and the input direction, the selector 245 will determine the subset of values to provide to the user for selection or further user input.

FIG. 9 illustrates an exemplary embodiment of a user interface 900 for determining a selected parameter in operation. The user interface 900 includes a multi-parameter control 220 that has been configured to receive user inputs for associated with value selections for a Gain parameter 230 and an Acquisition start parameter 315. The control 220 includes a parameter panel 225 and a value panel 240 as described in relation to FIGS. 2 and 3. The control 220 includes a parameter panel 225, a parameter identifier 230 and parameter value display 235, a value panel 240 and a selector 245.

As shown in FIG. 9, a user can provide horizontal gesture 905 to the parameter panel 225 to toggle or change the order of the parameters for which value selection can be provided. As shown in FIG. 9, the user has selected a parameter value of 32.4 for the Gain parameter 230 and has applied a horizontal gesture 905 via touch or mouse interaction to the parameter panel 225 causing the parameter panel 225 and the value panel 240 to transition to the next parameter for which the user wishes to select a value, e.g., the Acquisition start parameter 315. As a result of applying the horizontal gesture 905 to the parameter panel 225, the control 220 can be configured to transition the selector 915 associated with the Gain parameter 230 to the selector 920 associated with the Acquisition start parameter 315.

As further shown in FIG. 9, the user can also provide a horizontal gesture 910 to the value panel 240 causing the control 220 to transition from the Gain parameter 230 to the Acquisition start parameter 315. As a result, the value panel 240 can transition the provision of selector 915 to selector 920 to allow a user to provide a precise value selection for the Acquisition start parameter 315 via the selector 920.

Exemplary technical effects of the methods, systems, and computer-readable medium described herein include, by way of non-limiting example, determining and generating a sequence of actions that can be integrated into a client device 105 to provide an improved interface to a user performing a sequence of actions in regard to a defined objective. The improved interface can further improve the rate of objective completion on the client device 105, thereby generating a greater quantity of user inputs. Additionally, the improved interface provides more efficient execution of individual actions by providing the actions in an ordered sequence that is customized for the psychographic state of the user. In this way, the client device 105 can be improved to execute functionality that is associated with the actions more reliably and thereby improve the functionality of the computer with respect to the objective the client device 105 is configured to perform.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and an input device, (e.g., a mouse, a touchscreen, or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another.

Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about,", "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving data from a controller configured in an ultrasonic testing environment and coupled to an ultrasonic probe assembly, the data including a range of values associated with one or more parameters to be configured for performing ultrasonic inspection of a component of a machine within an enclosed tank of the ultrasonic testing environment, the received data including one or more parameters associated with positioning the ultrasonic probe assembly within the enclosed tank relative to the component of the machine to be inspected;
displaying a control in a user interface of the ultrasonic testing environment, the control including a display portion configured to display the one or more parameters and one or more values within the range of values associated with the one or more parameters and an interactive portion configured to receive a plurality of inputs;
determining a selected value associated with a first parameter;
displaying the selected value associated with the first parameter as a static display within the display portion of the control; and
transmitting the selected value associated with the first parameter to the controller so as to cause the controller to position the ultrasonic probe assembly within the enclosed tank relative to the component of the machine based on the selected value.

2. The method of claim 1, wherein the ultrasonic testing environment includes a processor coupled to the controller, the processor configured to receive data and user input for performing ultrasonic testing on the component of the machine and in response to the user input, execute instructions causing an ultrasonic probe coupled to the ultrasonic probe assembly to transmit ultrasonic signals into the test piece and to receive reflected ultrasonic signals from the test piece.

3. The method of claim 1, wherein determining the selected value associated with the first parameter includes,
receiving a first value selection input applied to the interactive portion;
determining an input direction and an input speed associated with the first value selection input;
determining a first subset of values, included in the range of values, based on the input speed and the input direction associated with the first value selection input, and providing the first subset of values as a first dynamic display within the display portion of the control;
receiving a second value selection input applied to the interactive portion;
determining an input direction and an input speed associated with the second value selection input;
determining a second subset of values, included in the range of values, based on the input speed and the input direction associated with the second value selection input, and providing the second subset of values as a second dynamic display within the display portion of the control; and
determining the selected value from the second subset of values based on removal of the second value selection input.

4. The method of claim 3, wherein the input direction associated with the first and second value selection inputs includes a vertical input direction and the input speed associated with the first and second value selection inputs includes a swipe-gesture input speed or an a drag-gesture input speed.

5. The method of claim 4, wherein the first and second subsets of values are provided in the dynamic display at a display rate determined based on the input speed and a user-configurable friction parameter configured to display values within the first and second subset of values at a predetermined rate and at a user-configured order of magnitude corresponding to the first and second subset of values.

6. The method of claim 3, further comprising receiving a tap-gesture input upon provision of the first dynamic display and responsive to the received tap-gesture input, providing the selected value in a static display, the selected value provided as the value displayed in the first dynamic display at a time the tap-gesture input was received.

7. The method of claim 1, further comprising determining a selected parameter, the determining the selected parameter including,
receiving a first parameter selection input applied to the interactive portion;
determining an input direction and an input speed associated with the first parameter selection input;
determining a first subset of parameters, included in the one or more parameters, based on the input speed and the input direction associated with the first parameter selection input, and providing the first subset of parameters as a first dynamic display within the display portion of the control;

receiving a second parameter selection input applied to the interactive portion;

determining an input direction and an input speed associated with the second parameter selection input;

determining a second subset of parameters, included in the one or more parameters, based on the input speed and the input direction associated with the second parameter selection input, and providing the second subset of parameters as a second dynamic display within the display portion of the control;

determining the selected parameter from the second subset of parameters based on removal of the second parameter selection input; and outputting the selected parameter as a static display within the display portion of the control.

8. The method of claim 7, wherein the input direction includes a horizontal input direction and the input speed is associated with an input speed corresponding to a swipe-gesture input or an input speed corresponding to a drag-gesture input.

9. The method of claim 8, wherein the subset of parameters are provided in the dynamic display at a display rate determined based on the input speed and a user-configurable friction parameter configured to display successive parameters within the subset of parameters at a predetermined rate.

10. The method of claim 7, further comprising receiving a tap-gesture input upon provision of the first dynamic display and responsive to the received tap-gesture input, providing the selected parameter in a static display, the selected parameter provided as the parameter displayed in the first dynamic display at a time the tap-gesture input was received.

11. The method of claim 1, wherein the interactive portion includes a graphical representation of a scrolling wheel emulating a rotary knob.

12. A system comprising:

an ultrasonic testing environment including a memory storing non-transitory computer-readable instructions, a controller, an ultrasonic probe assembly coupled to the controller, and an enclosed tank; and a data processor coupled to the controller, the data processor configured to execute the non-transitory computer-readable instructions, which when executed, cause the data processor to perform operations including, receiving data from the controller, the data including a range of values associated with one or more parameters to be configured for performing ultrasonic inspection of a component of a machine within the enclosed tank, the received data including one or more parameters associated with positioning the ultrasonic probe assembly within the enclosed tank relative to the component of the machine to be inspected;

providing a control in a user interface of the ultrasonic testing environment, the control including a display portion configured to display the one or more parameters and one or more values within the range of values associated with the one or more parameters and an interactive portion configured to receive a plurality of inputs;

determining a selected value associated with a first parameter;

outputting the selected value associated with the first parameter as a static display within the display portion of the control; and transmitting the selected value associated with the first parameter to the controller so as to cause the controller to position the ultrasonic probe assembly within the enclosed tank relative to the component of the machine based on the selected value.

13. The system of claim 12, wherein the processor is configured to receive data and user input for performing ultrasonic testing on the component of the machine and in response to the user input, execute instructions causing an ultrasonic probe coupled to the ultrasonic probe assembly to transmit ultrasonic signals into the test piece and to receive reflected ultrasonic signals from the test piece.

14. The system of claim 12, wherein the data processor is configured to execute the computer-readable instructions, which when executed further cause the processor to determine the selected value associated with the first parameter, the determining including, receiving a first value selection input applied to the interactive portion;

determining an input direction and an input speed associated with the first value selection input;

determining a first subset of values, included in the range of values, based on the input speed and the input direction associated with the first value selection input, and providing the first subset of values as a first dynamic display within the display portion of the control;

receiving a second value selection input applied to the interactive portion;

determining an input direction and an input speed associated with the second value selection input;

determining a second subset of values, included in the range of values, based on the input speed and the input direction associated with the second value selection input, and providing the second subset of values as a second dynamic display within the display portion of the control; and determining the selected value from the second subset of values based on removal of the second value selection input.

15. The system of claim 14, wherein the input direction associated with the first and second value selection inputs includes a vertical input direction and the input speed associated with the first and second value selection inputs includes a swipe-gesture input speed or an a drag-gesture input speed.

16. The system of claim 15, wherein the first and second subsets of values are provided in the dynamic display at a display rate determined based on the input speed and a user-configurable friction parameter configured to display values within the first and second subset of values at a predetermined rate and at a user-configured order of magnitude corresponding to the first and second subset of values.

17. The system of claim 14, wherein the data processor is configured to execute the computer-readable instructions, which when executed further cause the processor to receive a tap-gesture input upon provision of the first dynamic display and responsive to the received tap-gesture input, provide the selected value in a static display, the selected value provided as the value displayed in the first dynamic display at a time the tap-gesture input was received.

18. The system of claim 12, wherein the data processor is configured to execute the computer-readable instructions, which when executed further cause the data processor to determine a selected parameter, the determining including, receiving a first parameter selection input applied to the interactive portion;

determining an input direction and an input speed associated with the first parameter selection input;

determining a first subset of parameters, included in the one or more parameters, based on the input speed and the input direction associated with the first parameter selection input, and providing the first subset of parameters as a first dynamic display within the display portion of the control;

receiving a second parameter selection input applied to the interactive portion;

determining an input direction and an input speed associated with the second parameter selection input;

determining a second subset of parameters, included in the one or more parameters, based on the input speed and the input direction associated with the second parameter selection input, and providing the second subset of parameters as a second dynamic display within the display portion of the control;

determining the selected parameter from the second subset of parameters based on removal of the second parameter selection input; and output the selected parameter as a static display within the display portion of the control.

19. The system of claim 18, wherein the input direction includes a horizontal input direction and the input speed is associated with an input speed corresponding to a swipe-gesture input or an input speed corresponding to a drag-gesture input.

20. The system of claim 19, wherein the subset of parameters are provided in the dynamic display at a display rate determined based on the input speed and a user-configurable friction parameter configured to display successive parameters within the subset of parameters at a predetermined rate.

21. The system of claim 18, further comprising receiving a tap-gesture input upon provision of the first dynamic display and responsive to the received tap-gesture input, providing the selected parameter in a static display, the selected parameter provided as the parameter displayed in the first dynamic display at a time the tap-gesture input was received.

22. A non-transitory computer-readable storage medium containing program instructions, which when executed by at least one data processor, cause the at least one data processor to perform operations comprising:

receiving data from a controller configured in an ultrasonic testing environment and coupled to an ultrasonic probe assembly, the data including a range of values associated with one or more parameters to be configured for performing ultrasonic inspection of a component of a machine within an enclosed tank of the ultrasonic testing environment, the received data including one or more parameters associated with positioning the ultrasonic probe assembly within the enclosed tank relative to the component of the machine to be inspected;

providing a control in a user interface of the ultrasonic testing environment, the control including a display portion configured to display the one or more parameters and one or more values within the range of values associated with the one or more parameters and an interactive portion configured to receive a plurality of inputs;

determining a selected value associated with a first parameter;

outputting the selected value associated with the first parameter as a static display within the display portion of the control; and transmitting the selected value associated with the first parameter to the controller so as to cause the controller to position the ultrasonic probe assembly within the enclosed tank relative to the component of the machine based on the selected value.

23. The non-transitory computer-readable storage medium of claim 22, wherein the ultrasonic testing environment includes a processor coupled to the controller, the processor configured to receive user input for performing ultrasonic testing on the component of the machine and in response to the user input, execute instructions causing an ultrasonic probe coupled to the ultrasonic probe assembly to transmit ultrasonic signals into the test piece and to receive reflected ultrasonic signals from the test piece.

24. The non-transitory computer-readable storage medium of claim 22, wherein the program instructions further cause the computer to determine the selected value associated with the first parameter, the determining including, receiving a first value selection input applied to the interactive portion;

determining an input direction and an input speed associated with the first value selection input;

determining a first subset of values, included in the range of values, based on the input speed and the input direction associated with the first value selection input, and providing the first subset of values as a first dynamic display within the display portion of the control;

receiving a second value selection input applied to the interactive portion;

determining an input direction and an input speed associated with the second value selection input;

determining a second subset of values, included in the range of values, based on the input speed and the input direction associated with the second value selection input, and providing the second subset of values as a second dynamic display within the display portion of the control; and determining the selected value from the second subset of values based on removal of the second value selection input.

25. The non-transitory computer-readable storage medium of claim 24, wherein the input direction associated with the first and second value selection inputs includes a vertical input direction and the input speed associated with the first and second value selection inputs includes a swipe-gesture input speed or an a drag-gesture input speed.

26. The non-transitory computer-readable storage medium of claim 25, wherein the first and second subsets of values are provided in the dynamic display at a display rate determined based on the input speed and a user-configurable friction parameter configured to display values within the first and second subset of values at a predetermined rate and at a user-configured order of magnitude corresponding to the first and second subset of values.

27. The non-transitory computer-readable storage medium of claim 22, wherein the program instructions further cause the computer to determine a selected parameter, the determining including receiving a first parameter selection input applied to the interactive portion in a horizontal direction;

determining an input speed associated with the first parameter selection input;

determining a first subset of parameters, included in the one or more parameters, based on the input speed and the input direction associated with the first parameter selection input, and providing the first subset of parameters as a first dynamic display within the display portion of the control;

receiving a second parameter selection input applied to the interactive portion;

determining an input direction and an input speed associated with the second parameter selection input;

determining a second subset of parameters, included in the one or more parameters, based on the input speed and the input direction associated with the second parameter selection input, and providing the second subset of parameters as a second dynamic display within the display portion of the control, determining the selected parameter from the second subset of parameters based on removal of the second parameter selection input, and;

output the selected parameter as a static display within the display portion of the control.

28. The non-transitory computer-readable storage medium of claim 27, wherein the subset of parameters are provided in the dynamic display at a display rate determined based on the input speed and a user-configurable friction parameter configured to display successive parameters within the subset of parameters at a predetermined rate.

29. The non-transitory computer-readable storage medium of claim 27, wherein the program instructions further cause the computer to receive a tap-gesture input upon provision of the first dynamic display and responsive to the received tap-gesture input, provide the selected parameter in a static display, the selected parameter provided as the parameter displayed in the first dynamic display at a time the tap-gesture input was received.

* * * * *